(12) United States Patent
Johnson, Sr.

(10) Patent No.: US 9,074,828 B2
(45) Date of Patent: Jul. 7, 2015

(54) ENHANCED BOUNDARY LAYER HEAT TRANSFER BY PARTICLE INTERACTION

(71) Applicant: ECOPURO, LLC, Denver, CO (US)

(72) Inventor: William L. Johnson, Sr., Grove, OK (US)

(73) Assignee: ECOPURO, LLC, Denver, CO (US)

( * ) Notice: Subject to any disclaimer, the term of this patent is extended or adjusted under 35 U.S.C. 154(b) by 0 days.

(21) Appl. No.: 13/654,369

(22) Filed: Oct. 17, 2012

(65) Prior Publication Data

US 2013/0140006 A1 Jun. 6, 2013

Related U.S. Application Data

(63) Continuation-in-part of application No. 13/217,200, filed on Aug. 24, 2011, which is a continuation-in-part of application No. 13/167,683, filed on Jun. 23, 2011, now Pat. No. 8,701,774, which is a
(Continued)

(51) Int. Cl.
*F28F 13/02* (2006.01)
*F28F 13/12* (2006.01)
(Continued)

(52) U.S. Cl.
CPC ............... *F28F 7/00* (2013.01); *B29C 44/3469* (2013.01); *B29C 44/3415* (2013.01)

(58) Field of Classification Search
USPC ...................................................... 165/109.1
See application file for complete search history.

(56) References Cited

U.S. PATENT DOCUMENTS

| 2,356,367 | A | 8/1944 | Wright |
| 2,690,051 | A | 9/1954 | Peskin |

(Continued)

FOREIGN PATENT DOCUMENTS

| JP | 2008063411 | 3/2008 |
| WO | WO9220755 | 11/1992 |

(Continued)

OTHER PUBLICATIONS

Petkov et al., "Li insertion in ball-milled graphitic carbon studied by total x-ray diffraction," Journal of Physics: Condensed Matter, vol. 23, (2011), pp. 1-8.*
(Continued)

*Primary Examiner* — Kara Boyle
(74) *Attorney, Agent, or Firm* — Fellers, Snider, Blankenship, Bailey & Tippens, P.C.

(57) ABSTRACT

Enhanced heat transfer by kinetic movement of boundary layer film by introducing particles with specialized surfaces. A boundary layer is stagnant, reducing heat transfer into a flowing fluid. Boundary layer heat transfer is primarily conduction. The introduction of specialized particles into fluid promotes boundary layer mixing, thereby converting conduction to convection through the film. Particles of the invention tumble while mixing the boundary layer, which provides low surface area energy sites around the particles. Kinetic movement increases nucleation formation for gas phase transfer during boiling. Metal and ceramic nanoparticles in fluids increase fluid thermal conductivity. By modifying surface characteristics of such nanoparticles to promote boundary layer mixing, fluid heat transfer and thermal conductivity will increase. Specialized surface characteristics of materials ensure that particles interface with the boundary layer to produce kinetic mixing and low surface area energy sites for accelerated nucleation, resulting in enhanced heat transfer of gas or liquid.

34 Claims, 23 Drawing Sheets

Related U.S. Application Data continuation-in-part of application No. 13/181,476, filed on Jul. 12, 2011.

(60) Provisional application No. 61/392,558, filed on Oct. 13, 2010, provisional application No. 61/357,586, filed on Jun. 23, 2010, provisional application No. 61/412,257, filed on Nov. 10, 2010.

(51) Int. Cl.
*F28F 7/00* (2006.01)
*B29C 44/34* (2006.01)

(56) References Cited

U.S. PATENT DOCUMENTS

| | | | |
|---|---|---|---|
| 2,968,624 A | 1/1961 | Veatch et al. | |
| 5,122,292 A | 6/1992 | Eusebi et al. | |
| 5,232,627 A | 8/1993 | Burba, III et al. | |
| 5,252,239 A | 10/1993 | Eusebi | |
| 5,385,688 A | 1/1995 | Miller et al. | |
| 5,925,288 A | 7/1999 | Umamori et al. | |
| 5,948,845 A * | 9/1999 | Good et al. | 524/444 |
| 6,221,275 B1 | 4/2001 | Choi et al. | |
| 6,464,770 B1 * | 10/2002 | Palm et al. | 106/409 |
| 6,695,974 B2 | 2/2004 | Withers et al. | |
| 6,840,990 B2 | 1/2005 | Gallagher et al. | |
| 7,390,428 B2 | 6/2008 | Davidson et al. | |
| 7,820,066 B2 | 10/2010 | Jeffcoate et al. | |
| 7,871,533 B1 | 1/2011 | Haiping et al. | |
| 2004/0069454 A1 * | 4/2004 | Bonsignore et al. | 165/104.15 |
| 2005/0269548 A1 | 12/2005 | Jeffcoate et al. | |
| 2006/0075930 A1 * | 4/2006 | Wang et al. | 106/638 |
| 2007/0039721 A1 | 2/2007 | Murray | |
| 2007/0045886 A1 | 3/2007 | Johnson, Sr. | |
| 2008/0054217 A1 | 3/2008 | Hijikata et al. | |
| 2010/0093922 A1 | 4/2010 | Johnson, Sr. | |
| 2011/0001081 A1 | 1/2011 | Singh et al. | |
| 2011/0272156 A1 | 11/2011 | Johnson, Sr. | |
| 2011/0301277 A1 | 12/2011 | Johnson, Sr. | |
| 2012/0029094 A1 | 2/2012 | Johnson, Sr. | |

FOREIGN PATENT DOCUMENTS

| | | |
|---|---|---|
| WO | WO2011163529 | 12/2011 |
| WO | WO2012009384 | 1/2012 |

OTHER PUBLICATIONS

European Patent Office, "International Search Report and Written Opinion for PCT/US2012/060688", Jul. 31, 2013.

Ahn, H.S. et al., "Experimental study of critical heat flux enhancement during forced convective flow boiling of nanofluid on a short heated surface", International Journal of Multiphase Flow, May 1, 2010, pp. 375-384, vol. 36, No. 5.

Kim, H.D. et al., "Experimental studies on CHF characteristics of nano-fluids at pool boiling", International Journal of Multiphase Flow, Feb. 19, 2007, pp. 691-706, vol. 33, Publisher: Elsevier.

Ahn, H.S. et al., "Experimental study of critical heat flux enhancement during forced convective flow boiling of nanofluid on a short heated surface" (Abstract Only), International Journal of Multiphase Flow, May 1, 2010, pp. 375-384, vol. 36, No. 5.

Cha, J. N., et al., "Spontaneous Formation of Nanoparticle Vesicles from Homopolymer Polyelectrolytes (Abstract Only)", Journal of American Chemical Society, Jun. 13, 2003, pp. 8285-8289, vol. 125, No. 27, Publisher: American Chemical Society.

Chandler, D.L, "Bristly particles could be boon for powerplants", MIT News Office, Oct. 17, 2011, Publisher: Massachusetts Institute of Technology.

"Special Surface allows Boiling Water without Bubbles", Scientific Computing, Sep. 18, 2012, Publisher: www.scientificcomputing.com.

* cited by examiner

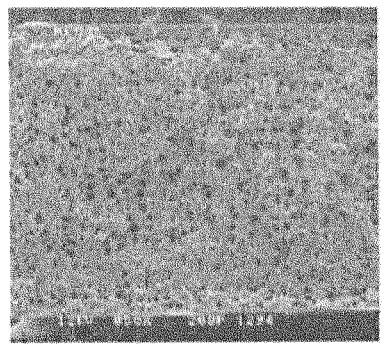
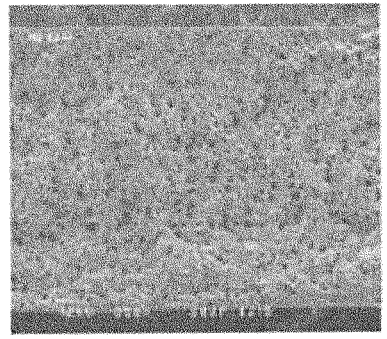
Polypropylene PC 90635-PP
12 melt index; 4.8 wt% kinetic mixing particle;
P = 0.65 g/cc, 45μ
FIG. 3  FIG. 4
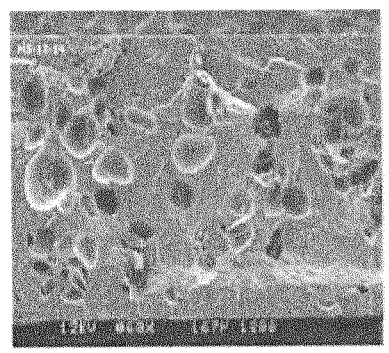
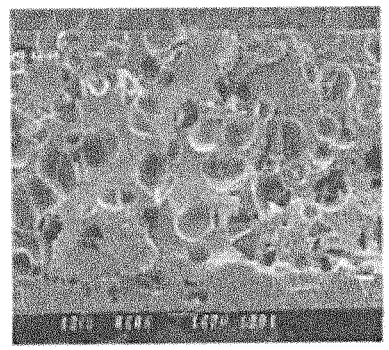
Polypropylene PC 90635-PP
12 melt index; 0.40 wt% kinetic mixing particle;
P = 0.50 g/cc, 163μ
FIG. 5  FIG. 6
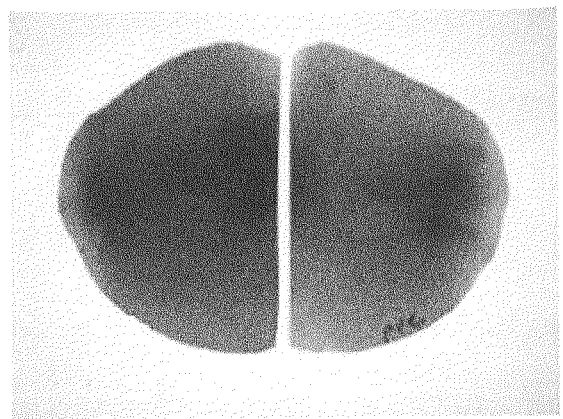
FIG. 7

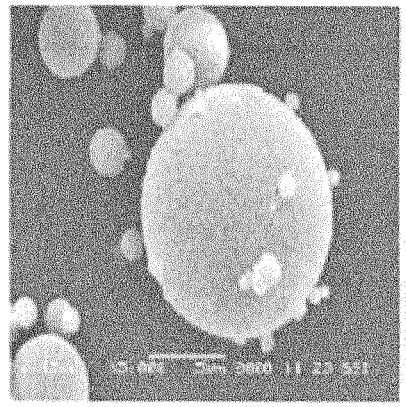 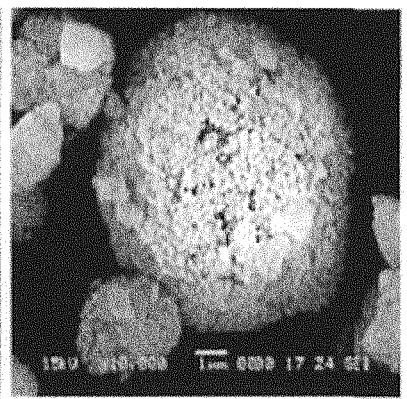
FIG. 26A          FIG. 26B
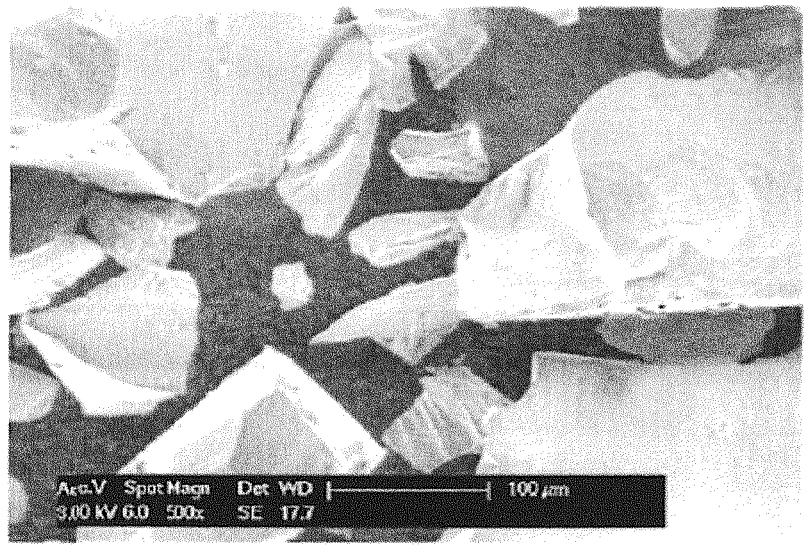
FIG. 27

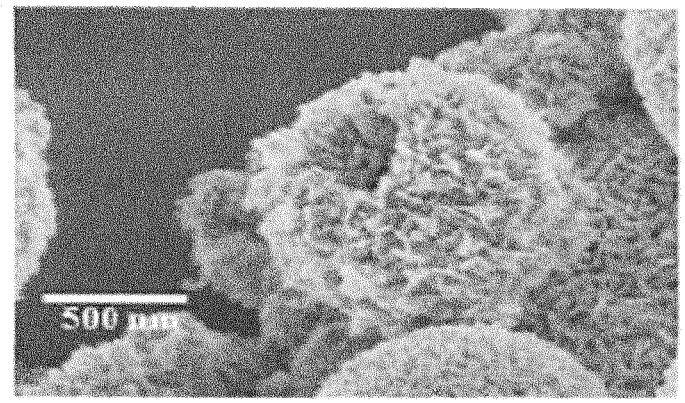
FIG. 37A
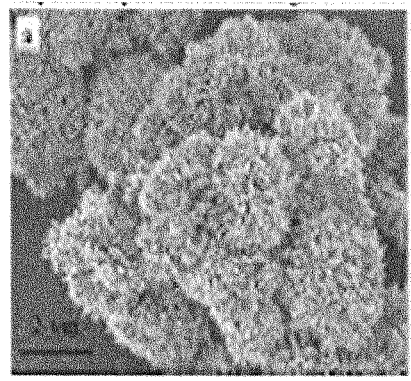 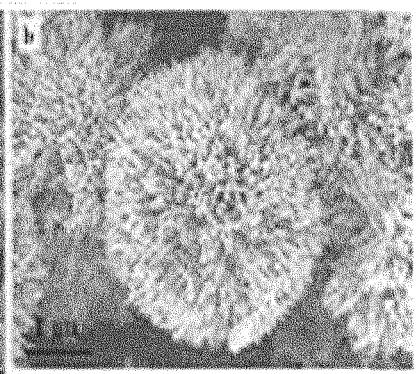
FIG. 37B     FIG. 37C

ENHANCED BOUNDARY LAYER HEAT TRANSFER BY PARTICLE INTERACTION

CROSS REFERENCE TO RELATED APPLICATIONS

This application is a Continuation-in-Part of U.S. patent application Ser. No. 13/217,200, filed Aug. 24, 2011, titled, "CELLULAR FOAM ADDITIVE", which claims the priority of U.S. Provisional Patent Application No. 61/392,558, filed Oct. 13, 2010, titled, "CELLULAR FOAM ADDITIVE". This application is also a Continuation-in-Part of U.S. patent application Ser. No. 13/167,683, filed Jun. 23, 2011, titled, "HYDRAULIC FRACTURING", which claims the priority of U.S. Provisional Patent Application No. 61/357,586, filed Jun. 23, 2010, titled, "HYDRAULIC FRACTURING". This application is also a Continuation-in-Part of U.S. patent application Ser. No. 13/181,476, filed Jul. 12, 2011, titled, "ADDITIVE FOR PAINT, COATINGS AND ADHESIVES", which claims the priority of U.S. Provisional Patent Application No. 61/412,257, filed Nov. 10, 2010, titled, "PAINT, COATINGS AND ADHESIVES". The contents of each of the above-listed applications are hereby incorporated by reference.

FIELD OF THE INVENTION

The application relates to a method of increasing the heat transfer of thermal fluids by reducing the effects of the boundary layer stagnant heat transfer profile. In particular, the invention relates to the addition of specially sized and shaped particles into a fluid to increase heat transfer.

BACKGROUND OF THE INVENTION

Heat transfer into a fluid involves the transfer of energy caused by a temperature differential between two bodies. For example, a heat exchanger design for heating a fluid is typically constructed of a highly conductive material, such as metal tubing containing a fluid flowing through the inside, wherein the tubing is heated from the outside. The heat transfers through the metal tubing by conduction, into the liquid through the boundary layer by conduction, and finally into the bulk fluid by convection.

Efforts to improve heat transfer include plate and frame heat exchangers, shell and tub heat exchangers, and a variety of different fin configurations for radiating or absorbing heat more efficiently.

Additionally, improvements based on fluid flow have been implemented to accelerate heat transfer. Examples include co-current flow, where the two hottest and coldest points of fluids flow together in the same direction in a heat exchanger. In contrast, counter flow devices flow the hottest and coldest points of fluids in opposite directions, which produces the greatest temperature differential between the two fluids. The greater temperature differential results in higher heat transfer efficiency for heat exchanger.

Fluid velocity has a significant effect on heat transfer. For example, laminar flow heat transfer mechanics have a lower heat transfer than turbulent flow heat exchangers. Therefore, turbulent heat transfer exchangers are preferred over laminar flow heat exchangers if the material being heated can withstand turbulent flow without degradation and if turbulent flow is economically feasible.

All flowing fluids have a wall effect or a boundary layer effect where the fluid velocity is greatly reduced at the point of contact with the wall of a vessel, such as a tube. The reduced fluid velocity hinders heat transfer efficiencies.

A further explanation of the boundary layer follows. Aerodynamic forces depend in a complex way on the viscosity of a fluid. As a fluid moves past an object, the molecules adjacent to the surface of the object stick to that surface. The flowing molecules of fluid just above the surface of the object are slowed by in their collisions with the fluid molecules that are sticking to the surface. These slowed molecules, in turn, slow down the flow just above them. The greater the distance away from the surface of the object, the fewer are the number of collisions that are affected by the surface of the object. This phenomenon results in a thin layer of fluid near the surface wherein the velocity changes from zero at the surface to the free stream value at a distance away from the surface. This thin layer is referred to as the boundary layer because the layer occurs on the boundary of the fluid.

As an object moves through a fluid, or as a fluid moves past an object, the molecules of fluid near the object are disturbed and move around the object. Aerodynamic forces are generated between the fluid and the object. The magnitudes of these forces depend on the shape of the object, the speed of the object, the mass of the fluid passing by the object. Additionally, two other important properties of the fluid affect the magnitude of aerodynamic forces, i.e., the viscosity, or stickiness, and the compressibility, or springiness, of the fluid. To properly model these effects, aerospace engineers use similarity parameters, which are ratios of these effects to other forces present in the problem. If two experiments have the same values for the similarity parameters, then the relative importance of the forces are being correctly modeled.

FIG. 1 shows the streamwise velocity variation from free stream to the surface. In reality, the effects are three dimensional. From the conservation of mass in three dimensions, a change in velocity in the streamwise direction causes a change in velocity in the other directions as well. As explained above, there is a small component of velocity perpendicular to the surface that displaces or moves the flow above it. The thickness of the boundary layer can be defined to be the amount of this displacement. The displacement thickness depends on the Reynolds number, which is the ratio of inertial (resistant to change or motion) forces to viscous (heavy and gluey) forces, is given by the equation:

Reynolds number ($Re$) equals velocity ($V$) times density ($r$) times a characteristic length ($l$) divided by the viscosity coefficient ($mu$), i.e., $Re = V*r*l/mu$.

As can be seen in FIG. 1, boundary layers may be either laminar, i.e., layered, or turbulent, i.e., disordered, depending on the value of the Reynolds number. For lower Reynolds numbers, the boundary layer is laminar and the streamwise velocity changes uniformly as one moves away from the wall, as shown on the left side of FIG. 1. For higher Reynolds numbers, the boundary layer is turbulent and the streamwise velocity is characterized by unsteady, i.e., changing with time, swirling flows inside the boundary layer. The external flow reacts to the edge of the boundary layer just as it would to the physical surface of an object. Therefore, the boundary layer gives any object an "effective" shape, which is usually slightly different from the physical shape. The boundary layer may lift off or "separate" from the body and create an effective shape much different from the physical shape. Flow separation occurs because the flow in the boundary layer has very low energy relative to the free stream, and is more easily driven by changes in pressure. Flow separation is the reason for airplane wing stall at high angle of attack. The effects of the boundary layer on lift are expressed mathematically by lift coefficient and the effects on drag by a drag coefficient.

The portion of a fluid flow near a solid surface is the portion where shear stresses are significant and inviscid-flow assumption may not be used. All solid surfaces interact with a viscous fluid flow because of the no-slip condition, which is a physical requirement that the fluid and solid have equal velocities at their interface. Thus, a fluid flow is retarded by a fixed solid surface and a finite, slow-moving boundary layer is formed. For a boundary layer to be thin, the Reynolds number of the body must be large, i.e., $10^3$ or more. Under these conditions, the flow outside the boundary layer is essentially inviscid and plays the role of a driving mechanism for the layer.

Referring now to FIG. 2, a typical low-speed or laminar boundary layer is shown in the illustration. Such a display of the streamwise flow vector variation near the wall is called a velocity profile. The no-slip condition requires that $u(x,0)=0$, as shown, where u is the velocity of flow in the boundary layer. The velocity rises monotonically with distance y from the wall, finally merging smoothly with the outer, i.e., inviscid, stream velocity $U(x)$. At any point in the boundary layer, the fluid shear stress $\tau$, is proportional to the local velocity gradient, assuming a Newtonian fluid. The value of the shear stress at the wall is most important, since the value of shear stress relates not only to the drag of the body but often also to its heat transfer. At the edge of the boundary layer, $\tau$ approaches zero asymptotically. There is no exact spot where $\tau=0$, therefore the thickness $\delta$ of a boundary layer is usually defined arbitrarily as the point where $u=0.99U$.

Recently, technologies have been developed that utilize nano-sized particles. Some of these technologies have focused on increasing heat transfer of a fluid or gas by increasing conductivity through the use of nano-powders. Such nano-powders are typically made from metals or ceramics. However, the use of such powders typically increase the viscosity of the fluid, resulting in an increased boundary layer, which tends to reduce the potential heat transfer gains.

Nanoparticles are made in many different ways they can be milled, chemically grown, precipitated out of a fluid through the reaction process or by other processes. These are only a few methods of manufacturing nano materials in industry that is in its infancy and growing rapidly.

Nanoparticles have had two processing problems which are: 1. The necessity of mechanical mixing to break up nano particle conglomerations and disperse nanoparticles homogeneously throughout a fluid; and 2. Once the nanoparticles have been suspended throughout the fluid, maintaining these particles in a stable precipitation over a prolonged time is problematic due to a tendency of the nanoparticles to settle out and re-conglomerate.

Techniques used to address the difficulty of nano material dispersion and prolonged stabilization include highly specialized surfactants, surface coatings and a variety of different mechanical mixing process.

The highly specialized surfactants that are used for nano dispersion have became their own unique specialty over the last 10 years and someone skilled of the surfactants can help choose the appropriate one for a variety of applications.

Additionally, there has been a large development of nano coatings that can produce surface effects such as: hydrophobic, hydrophilic, polar, nonpolar, negative and positively charged surfaces including adding functional groups.

Typical thermally conductive fluids in which nanoparticles are suspended include water, aqueous brines, mixtures of water with at least one of the group consisting of alcohols, glycols, and ammonia, hydro carbons, mineral oils, natural oils, synthetic oils, fats, waxes, ethers, esters, glycols, halogen derivatives of at least one of the group consisting of hydrocarbons, mineral oils, natural oils, synthetic oils, fats, waxes, ethers, esters, and glycols, 40 silicate esters, biphenyl, polyaromatic compounds, salt-hydrates, organic eutectics, clathrate-hydrates, paraffins, inorganic and organic eutectic mixtures, and combinations as set forth in U.S. Pat. No. 7,390,428 to Davidson et al for "Compositions with nanoparticle size conductive material powder and methods of using same for transferring heat between a heat source and a heat sink".

Some nano materials research over the last 15 years has been directed to thermal conductivity in fluids. For example, U.S. Pat. No. 6,695,974 to Withers for "Nano carbon materials for enhancing thermal transfer in fluids" teaches that the addition of metal and oxide nanoparticles that are small enough to remain in suspension in a fluid can substantially enhance the thermal conductivities of the fluid and thus substantially enhance heat transfer. The smaller the particle size the greater the effect of increasing the nanofluid thermal conductivity as well as the higher the thermal conductivity of the nanoparticle. For example, the thermal conductivity of a nanoparticle copper in a fluid provides a higher thermal conductivity than aluminum oxide because copper metal has a higher thermal conductivity than aluminum oxide."

Heat transfer from a surface through the boundary layer of a fluid can also be improved by imperfections in the surface of a body. As an example, almost everyone who has ever cooked pasta has watched water boil in a pot and has noticed a peculiar phenomenon, namely that bubbles tend to form in one area on the bottom of the pan consistently. The usual assumption is that the bubble forming area is a hot spot in the burner or is a thinner region in the pan. Those assumptions are plausible. However, if the pan is turned or moved on the cooking surface the bubble forming areas may still produce bubbles more consistently than other areas.

What may be overlooked when watching the bubbles form in a bubble forming region of a pan is that there is usually a small surface deformity that creates a low surface energy point that allows bubbles to continuously form in that spot or region.

Experimental studies of critical heat flux enhancements using nanofluids under convection flow conditions have been performed, as discussed in "Experimental study of critical heat flux enhancement during forced convective flow boiling of nanofluid on a short heated surface", by Ho Seon Ahn, Hyungdae Kim, HangJin Jo, SoonHo Kang, WonPyo Chang, Moo Hwan Kim, *International Journal of Multiphase Flow* 36 (2010) 375-384, incorporated herein by reference.

Previous studies have suggested that a likely critical heat flux (CHF) enhancement mechanism for nanofluids is an improvement in the ability of the fluid to wet the surface due to a thin nanoparticle sorption layer formed by evaporation of a nanoparticle containing microlayer beneath a bubble growing at the heated surface. Recently studies have focused on convective flow boiling of nanofluids in a circular stainless steel tube using the electrical heating. The studies reported significant increases in flow boiling critical heat flux of nanofluids with alumina, diamond, and zinc oxide that the contact angle on the tube decreased to control the concentration of nanofluid. Also, they found, in higher concentrations of nanofluid, that the critical heat flux enhancement was higher whereas the static contact angle on the fouled surface was lower. It was concluded from the experiments that the improved surface wettability due to the nanoparticles deposition layer caused significant critical heat flux enhancements during the convective flow boiling of nanofluids. The findings were consistent with previous pool boiling research.

Early research showed that a small surface change characteristic increases heat transfer by use of the nano fluid through a phenomena of nano plating of stagnant nanoparticles film on a surface. Even though surface plating phenomena caused by the electrical heating coils was accidental, the experiment resulted in a greater heat transfer.

One hypothesis was that the plausible reason for the changes in boiling heat transfer performance was the nanoparticle deposition onto the surface. Deposition was confirmed by a surface roughness measurement after the nanofluid boiling tests and the consequent change in nucleate site density. Pool boiling critical heat flux experiments of pure water on a nanoparticle-fouled heater as a result of a pre-boiling in nanofluid, showed an interesting result that the same magnitude of the significant critical heat flux increase in the nanofluid was observed for the nanoparticle-fouled surface submerged even in pure water.

This solution for increasing critical heat flux seems simple, i.e., just produce nano plating surfaces on piping/and tubing for commercial use. There are two problems with this solution, however. The first is that it is not cost-efficient to produce nano composite surfaces. The second problem relates to the fact that, in real applications, heat transfer surfaces tend to become fouled which, would reduce the efficiency of the nano plating.

As set forth in "Experimental Study of Critical Heat Flux Enhancement During Forced Convective Flow Boiling of Nanofluid on a Short Heated Surface", by Ho Seon Ahn, Hyungdae Kim, HangJin Jo, SoonHo Kang, WonPyo Chang, Moo Hwan Kim, *International Journal of Multiphase Flow* 36 (2010) 375-384, which is hereby incorporated by reference, it was found that adding tiny amounts (less than 0.001% by volume) of alumina nanoparticles to a conventional cooling liquid could significantly increase the critical heat flux (CHF) up to 200%. The large critical heat flux enhancement in nanofluids were attributed to the surface wettability effect, which was induced by nanoparticles deposition by boiling of the fluid.

Finally, difficulties associated with conducting heat into a flowing fluid have been attributed to the existence of a "film" of gas that is closely adherent to a metal surface when conducting heat into or out of a gas. As can be seen in U.S. Pat. No. 2,690,051 to Peskin, various attempts have been made to overcome the resistance to conduction of heat through the film. However, these efforts have mainly consisted of expedients for increasing the velocity and turbulence of the gas in the neighborhood of the heated surfaces. Some gains have been made in that way, but the film still remains the greatest impediment to heat transfer.

SUMMARY OF THE INVENTION

The invention of the application relates to a breakthrough technology for introducing nano to micron size kinetic boundary layer mixing particles into a fluid or gas to convert the boundary layer from a conductive heat transfer film into convective heat transfer film from the liquid to gas phase and from the gas phase to the liquid. The invention will work in laminar or turbulent regions of fluid flowing in a liquid or gas phase.

The present invention is directed to kinetically mixing the boundary layer film throughout a heat transfer phase from a liquid to a gas and from a gas to a liquid by producing a continuous moving particle film.

There have been many techniques that have helped with the inherent difficulty of nano material dispersion and prolonged stabilization that include: highly specialized surfactants, surface coatings and a variety of different mechanical mixing process.

The highly specialized surfactants that are used for nano dispersion have become their own unique specialty over the last 10 years and someone skilled of the surfactants can help choose the appropriate one for a variety of applications.

There has been a large development of nano coatings which can produce surface effects such as: hydrophobic, hydrophilic, polar, nonpolar, negative and positively charged surfaces including adding functional groups.

The technology of the invention can be used with surface coatings and in the presence of surfactants but provides the benefit of nano dispersion, not by the use of these processing aids, but instead by the unique surface characteristic of the particles interacting in the boundary layer to promote kinetic mixing.

Typical thermal conductive fluids in which nanoparticles are suspended and which may benefit from the technology of the invention is not limited to these groups. For example, U.S. Pat. No. 7,390,428 teaches fluids may consisting of water, aqueous brines, mixtures of water with at least one of the group consisting of alcohols, glycols, and ammonia, hydro carbons, mineral oils, natural oils, synthetic oils, fats, waxes, ethers, esters, glycols, halogen derivatives of at least one of the group consisting of hydrocarbons, mineral oils, natural oils, synthetic oils, fats, waxes, ethers, esters, and glycols, silicate esters, biphenyl, polyaromatic compounds, salt-hydrates, organic eutectics, clathrate-hydrates, paraffins, inorganic and organic eutectic mixtures, and combinations.

Some nano materials research over the last 15 years has been directed to thermal conductivity in fluids. For example, U.S. Pat. No. 6,695,974 teaches that it has been demonstrated that the addition of metal and oxide nanoparticles that are small enough to remain in suspension in a fluid can substantially enhance the thermal conductivities of the fluid and thus substantially enhance heat transfer. The smaller the particle size the greater the effect of increasing the nanofluid thermal conductivity as well as the higher the thermal conductivity of the nanoparticle. For example, the thermal conductivity of a nanoparticle copper in a fluid provides a higher thermal conductivity than aluminum oxide because copper metal has a higher thermal conductivity than aluminum oxide."

One example application, involving heat transfer through a boundary layer is a typical air conditioner cycle. A typical evaporation cycle works as follows: First, a compressor compresses cool refrigerant gas, causing it to become hot, high-pressure refrigerant gas. Second, the hot gas runs through a set of coils so it can dissipate its heat, and it condenses into a liquid. Third, the liquid runs through an expansion valve, and in the process it evaporates to become cold, low-pressure gas. Fourth, cold gas runs through a set of coils that allow the gas to absorb heat and cool down the air inside the building.

The boundary layer is present more dominantly in the condensation stage than it is the compression stage of the gas. There is a boundary layer present caused by the introduction of a lubricating oil on the surface of the entire coil system therefore the rolling and tumbling of the particles producing agitation will produce better heat transfer through this film. Industrial refrigeration systems used chilled water systems in which kinetic boundary layer mixing particles can be incorporated not only into the refrigerant side but also into the waterside increasing the transfer efficiency on both sides of the industrial unit.

Kinetic Mixing Particles Promote Nucleation

The incorporation of highly specialized particles that are mixed into a liquid will produce nucleation sites inside the boundary layer and create low surface energy regions to greatly enhance heat transfer.

The following two fluid dynamics illustrations can show how surface characteristics can used to produce low surface energy regions for rapid nucleation sites because gases and liquids naturally move around and over structural bodies and particles.

1. Airplane wings are designed to produce lift by an unequal deformation of air flowing over a wing caused by the geometric shape of the wing. The air deformity produces a low pressure region on the top of the wing and a high-pressure region under the wing, which results in lift.

2. Water flowing down a river and over a smooth rock will create little to no turbulence while a river flowing over rocks having abrupt edges, cavities, protrusions, jagged surfaces etc. will produce lots of turbulence.

Turbulence produces a low surface energy region that allows nucleation to take place. The method of the invention focuses on the "rocks" having dynamic surface characteristics rolling down a "river" producing nucleation sites, where the "river" is the boundary layer and the particles are being pushed by the higher velocity profile adjacent to the boundary layer.

The incorporation of highly specialized particles that are mixed into a liquid will produce nucleation sites inside the boundary layer and create low surface energy regions to greatly enhance heat transfer.

As set forth in Applicant's U.S. Patent Application Publication No. 2012/0029094, entitled, "Cellular Foam Additive", incorporated herein by reference, Applicant teaches that the addition of nano and micron size three-dimensional structural kinetic mixing particles produce micro and nano size mechanical openings in plastic during a mixing process. The openings allow gas dispersion into the polymer, thereby greatly reducing mixing time and the effects of gas solubility. The three-dimensional, kinetic mixing particles of the invention can be tailored to have a variety of sizes and shapes where the structural features, such as blade length, cavity depth, particle void size, protruding member size, spine-like structure length, etc., can produce cells in foam of a desired size.

When kinetic mixing particles are added to a fluid flowing through a vessel receiving external heat, the boundary layer film thickness changes during boiling and condensing of the fluid. The kinetic mixing particles are trapped within the boundary layer of a flowing fluid and continuously produce agitation. Once the boundary layer film is removed by evaporation, the particles remain in suspension with the resulting gas and its associated accelerated velocity profile until the condensation stage. In the condensation stage, the particles become trapped once again in the boundary layer film as it is formed, thereby producing a continuous agitation of the boundary layer film.

By tailoring the surface characteristics of particles that are introduced into a fluid, fluid dynamics and particle physics may be enhanced by the surface characteristics of the particles to facilitate continuous interaction in the boundary layer until the film thickness is diminished by evaporation. Once the fluid has evaporated, the particles no longer affect the heat transfer.

One object of the present invention is to provide improved methods of heat transfer in a gas, whereby the heat may be transmitted by radiation as well as convection and whereby the film resistance to heat flow may be appreciably reduced.

An example of an application wherein the boundary layer film may be removed by evaporation is in a turbine system for the production of electricity. The boundary layer forms in flowing liquid as flowing fluid is converted into a two-phase flow. Evaporation of the liquid produces steam. Condensation of the steam converts the steam into a liquid again. During this process cycle the boundary layer film thickness changes due to thermodynamic variables such as heat vaporization, pressures differentials caused by phase changes, and viscosity variations influenced by temperature. During this process hard water deposits have the opportunity to form throughout the system, which greatly reduces the heat transfer and restricts the flow of fluids and gases resulting in an increase in cost to produce energy. The kinetic boundary layer mixing particles of the invention continuously roll in the boundary layer and on the surface to produce a polishing effect that has the possibility of reducing calcification deposits from forming, which will save energy and protect equipment.

Many process plants use fluid for heating and cooling. The plants typically face the same problem associated with deposits being formed, which result in poor heat transfer and eventually results in a loss of equipment. Highly specialized kinetic mixing particles can work in any fluid that is being used by selecting appropriate particle materials with chemical stability and appropriate particle size.

Kinetic Mixing Particles Agitate the Boundary Layer

As a general example to illustrate kinetic mixing, consider a hard sphere rolling on a soft material travels in a moving depression. The material is compressed in front and rebounds at the rear. Where the material is perfectly elastic, the energy stored in compression is returned to the sphere at its rear. Actual materials are not perfectly elastic, however, so energy dissipation occurs, the result being kinetic energy, i.e., rolling. By definition, a fluid is a material continuum that is unable to withstand a static shear stress. Unlike an elastic solid, which responds to a shear stress with a recoverable deformation, a fluid responds with an irrecoverable flow. The irrecoverable flow may be used as a driving force for kinetic mechanical mixing in the boundary layer. By using the principle of rolling, kinetic friction and the increased fluid sticking at the surface of the no-slip zone produces adherents while the velocity adjacent to the boundary layer produces an inertial force upon the particle. The inertial force rotates the particle along the surface of mechanical process equipment regardless of mixing mechanics used, e.g., static, dynamic or kinetic.

Geometric design or selection of structural particles is based on the fundamental principle of surface interaction with the sticky film in the boundary layer where the fluid velocity is zero. Mechanical surface adherence is increased by increasing particle surface roughness. Particle penetration deep into the boundary layer produces kinetic mixing. Particle penetration is increased by increasing sharpness of particle edges or bladelike particle surfaces. A particle having a rough and/or sharp particle surface exhibits increased adhesion to the non-slip zone, which promotes better surface adhesion than a smooth particle having little to no surface characteristics. The ideal particle size will differ depending upon the fluid due to the viscosity of a particular fluid. Because fluid viscosity differs depending on the fluid, process parameters, such as temperature and pressure as well as mixing mechanics produced by shear forces and surface polishing on mechanical surfaces will also differ, which creates a variation in boundary layer thickness. A rough and/or sharp particle surface allows a particle to function as a rolling kinetic mixing blade in the boundary layer. Particles having rough and/or sharp edges that roll along a fluid boundary layer will produce micro mixing by agitating the surface area of the boundary layer.

BRIEF DESCRIPTION OF THE DRAWINGS

FIGS. 3-6 show a base polystyrene or polypropylene foam with direct gas injection, wherein the weight % of additive ranges from 0.35 wt % to 4.2 wt %, wherein the cells size ranges from 45 micron to 163 microns.

FIG. 7 shows two samples of rigid PVC with the same pigment loading in both samples wherein one sample includes kinetic boundary layer mixing particles.

FIG. 26A is an SEM images of fly ash particles at 5,000× magnification.

FIG. 26B is an SEM image of fly ash particles at 10,000× magnification.

FIG. 27 is an SEM image of recycled glass, categorized as a kinetic particle Type III, at 500× magnification wherein some solid materials have the ability to produce conchordial fracturing in order to produce surface characteristics to promote boundary layer mixing.

FIG. 37A is an SEM image of nanostructured CoOOH hollow spheres, which are versatile precursors for various cobalt oxide datives (e.g., $Co_3O_4$, $LiCoO_2$), and also possess excellent catalytic activity.

FIG. 37B is an SEM image of CuO, which is an important transition metal oxide with a narrow bandgap (EG) 1.2 eV). CuO has been used as a catalyst, a gas sensor, in anode materials for Li ion batteries. CuO has also been used to prepare high temperature super conductors and magnetoresistance materials.

FIG. 37C is an SEM image of CuO, which is an important transition metal oxide with a narrow bandgap (EG) 1.2 eV). CuO has been used as a catalyst, a gas sensor, in anode materials for Li ion batteries. CuO has also been used to prepare high temperature super conductors and magnetoresistance materials.

DETAILED DESCRIPTION OF THE PREFERRED EMBODIMENTS

Figure 1:
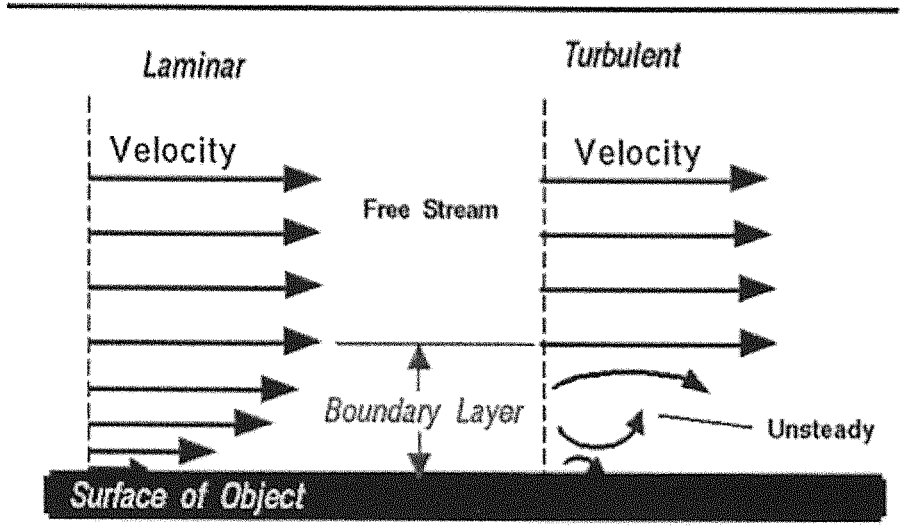
FIG. 1 is a graphical explanation of boundary layer concepts.
Figure 2:
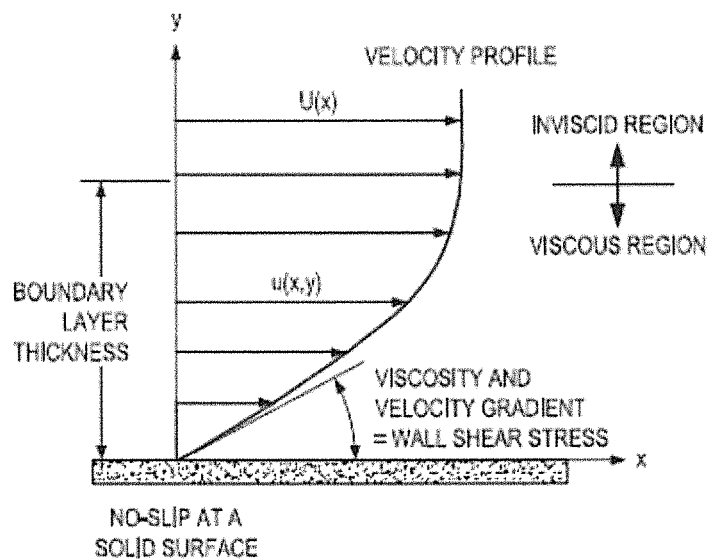
FIG. 2 is a graphical explanation of a low speed or laminar boundary layer.

This invention utilizes boundary layer mixing. That is, the invention relates to effects of introducing particles having sizes ranging from nano to micron, e.g., from 3 nm to 70 μm, into a fluid. The invention uses the static film principal of the boundary layer coupled with the coefficient of friction of a particle being forced to rotate or tumble in the boundary layer due to fluid velocity differentials. Therefore, the invention relates to promoting kinetic mixing through the use of structural fillers having a specialized size and specialized surface characteristics.

The invention is contemplated as improving heat transfer of a flowing fluid in the following three areas:

1. The addition of Applicant's particles promotes low surface area energy regions adjacent to the particle, which allows rapid nucleation of gases in a fluid during phase change, i.e., from a liquid to a gas. As the particles kinetically mix the stagnant film of the boundary layer, the particles are creating low surface energy areas that allow the bubbles to rapidly escape through the stagnant film, which increases the heat transfer and accelerates the phase change.

2. The addition of Applicant's particles promotes improved dispersion of nano sized particles and kinetic mixing of the boundary layer. The boundary layer's heat transfer mechanism is conduction. By continuously mixing the boundary layer the heat transfer mechanism is converted to convection, which accelerates heat transfer. When these highly specialized particles are used with nano fluids, the particles increase the dispersion property of the nanoparticles and helps break up conglomerations of nanoparticles. The improved dispersion, for example, of a nano-metal or ceramic suspended in a fluid, can help increase heat transfer by keeping these particles in suspension.

3. The addition of Applicant's particles increase flow of gases and fluids by converting the stagnant film coefficient of drag of the boundary layer to a kinetic coefficient of drag. This is important in heat transfer fluids that incorporate nanoparticles to increase thermal conductivity. The addition of nanoparticles increases the viscosity and the effects of the boundary layer, which reduces the velocity and heat transfer efficiency. These negative effects can be overcome by the use of the applicant's highly specialized particles.

Kinetic Mixing Particles Promote Nucleation

The addition of Applicant's particles promotes low surface area energy regions adjacent to the particle, which allows rapid nucleation of gases in a fluid during phase change from liquid to a gas. As the particles kinetically mix the stagnant film of the boundary layer, the particles create low surface energy areas that allow bubbles to rapidly escape through the stagnant film, thereby increasing heat transfer and accelerating the phase change.

Applicant's co-pending U.S. patent application, published as Publication No. 2012/0029094, entitled, "Cellular Foam Additive", teaches the addition of kinetic mixing particles to a foam for promoting improved dispersion of blowing agents, reactive and non-reactive additives. The application is incorporated herein by reference. Applicant teaches that the addition of nano and micron size three-dimensional structural kinetic mixing particles produce micro and nano size mechanical openings in plastic during a mixing process. The openings allow gas dispersion into the polymer, thereby greatly reducing mixing time and the effects of gas solubility. The three-dimensional, kinetic mixing particles of the invention can be tailored to have a variety of sizes and shapes where the structural features, such as blade length, cavity depth, particle void size, protruding member size, spine-like structure length, etc., can produce cells in foam of a desired size.

As can be seen from FIGS. 3, 4, 5, and 6, referenced in the table below, the addition of Applicant's kinetic mixing particles in a polypropylene results in cell sizes of 45 and 163 microns, respectively. The addition of particles to fluids having a similar viscosity to polypropylene will produce similar cell sizes.

| Figure # | Resin | % Kinetic Mixing Particles in pellets | % pellets used in product feed | % Kinetic Mixing Particles in product shown in Figure | Cell Size Microns |
|---|---|---|---|---|---|
| 3, 4 | PP | 40.00% | 12.00% | 4.80% | 45 |
| 5, 6 | PP | 40.00% | 1.00% | 0.40% | 163 |

Kinetic Mixing Particles Agitate the Boundary Layer

When kinetic mixing particles are added to a fluid flowing through a vessel receiving external heat, the boundary layer film thickness changes during boiling and condensing of the fluid. The kinetic mixing particles are trapped within the boundary layer of a flowing fluid and continuously produce agitation. Once the boundary layer film is removed by evaporation, the particles remain in suspension with the resulting gas and its associated accelerated velocity profile until the condensation stage. In the condensation stage, the particles become trapped once again in the boundary layer film as it is formed, thereby producing a continuous agitation of the boundary layer film.

By tailoring the surface characteristics of particles that are introduced into a fluid, fluid dynamics and particle physics may be enhanced by the surface characteristics of the particles to facilitate continuous interaction in the boundary layer until the film thickness is diminished by evaporation. Once the fluid has evaporated, the particles no longer affect the heat transfer.

One object of the present invention is to provide improved methods of heat transfer in a gas, whereby the heat may be transmitted by radiation as well as convection and whereby the film resistance to heat flow may be appreciably reduced.

Early pioneers in boundary layer principles recognized difficulties posed by the boundary layer film but did not realize that, by changing the characteristics of particles, it is possible to maintain a continuous agitation of the boundary layer. Applicant's invention achieves continuous agitation rather than on random impacts of particles on the boundary layer film.

As set forth in Applicant's publication US 2011/0301277, entitled, "Additive for Paint Coatings and Adhesives", incorporated herein by reference, kinetic mixing particles affect fluid flow. In particular, the preferred size ranges of the particles are from 500 nm to 1 μm, more particularly, from 1 μm to 30 μm, although any sub ranges within the defined ranges are also contemplated as being effective to promote kinetic mixing.

Typically when particles are added to a fluid, e.g., when metallic particles are added to a fluid to increase conductivity, the fluid becomes more viscous, which increases a size of the boundary layer of a flowing fluid. Consequently, gains in heat transfer tend to be offset. However, when adding kinetic mixing particles having the properties described below, increased mixing is promoted at the boundary layer to promote heat transfer from the boundary layer to the body of the fluid. Examples of increased mixing and dispersion are discussed below.

Figure 8:
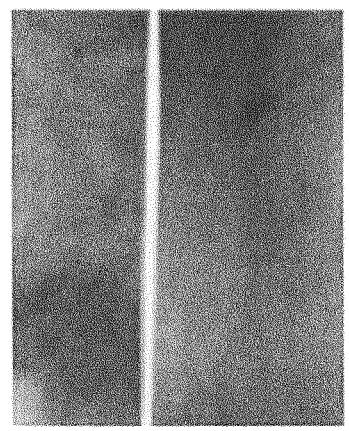
FIG. 8 shows two samples of polycarbonate with the same pigment loading in both samples wherein one sample includes kinetic boundary layer mixing particles.

The introduction of kinetic mixing particles results in excellent dispersion capabilities, as illustrated by FIGS. 7 and 8 in viscosity materials such as thermoplastics in a high shear mixing environment.

FIG. 7 shows a rigid PVC having the same pigment loading in both samples. It can clearly be seen that the left sample having the kinetic boundary layer mixing particles therein exhibits improved dispersion.

FIG. 8 shows polycarbonate having the same pigment loading in both samples. It can clearly be seen that the sample on the right, having the kinetic boundary layer mixing particles, exhibits better dispersion.

FIGS. 7 and 8 illustrate the benefits of kinetic boundary layer mixing particles in relationship to dispersion. The improved dispersion properties allows a base material to have fewer additives because the presence of kinetic mixing particles disburses additives better, thereby producing the same beneficial properties of an additive.

Mixing and Blending of Dissimilar Materials

Figure 9:
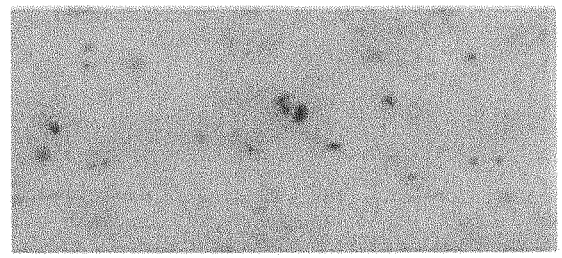
FIG. 9 shows a rigid PVC with ABS spots.

FIG. 9 shows rigid PVC with ABS spots. These two materials, even under high shear conditions chemically do not want to mix or blend together.

Figure 10:
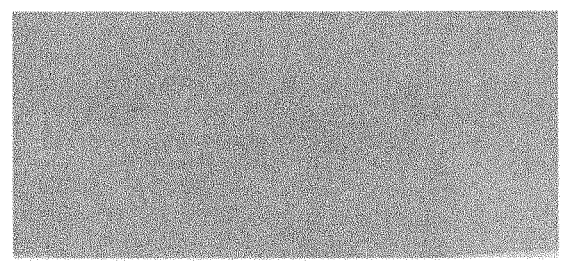
FIG. 10 shows PVC and ABS mixed together.
Figure 11:
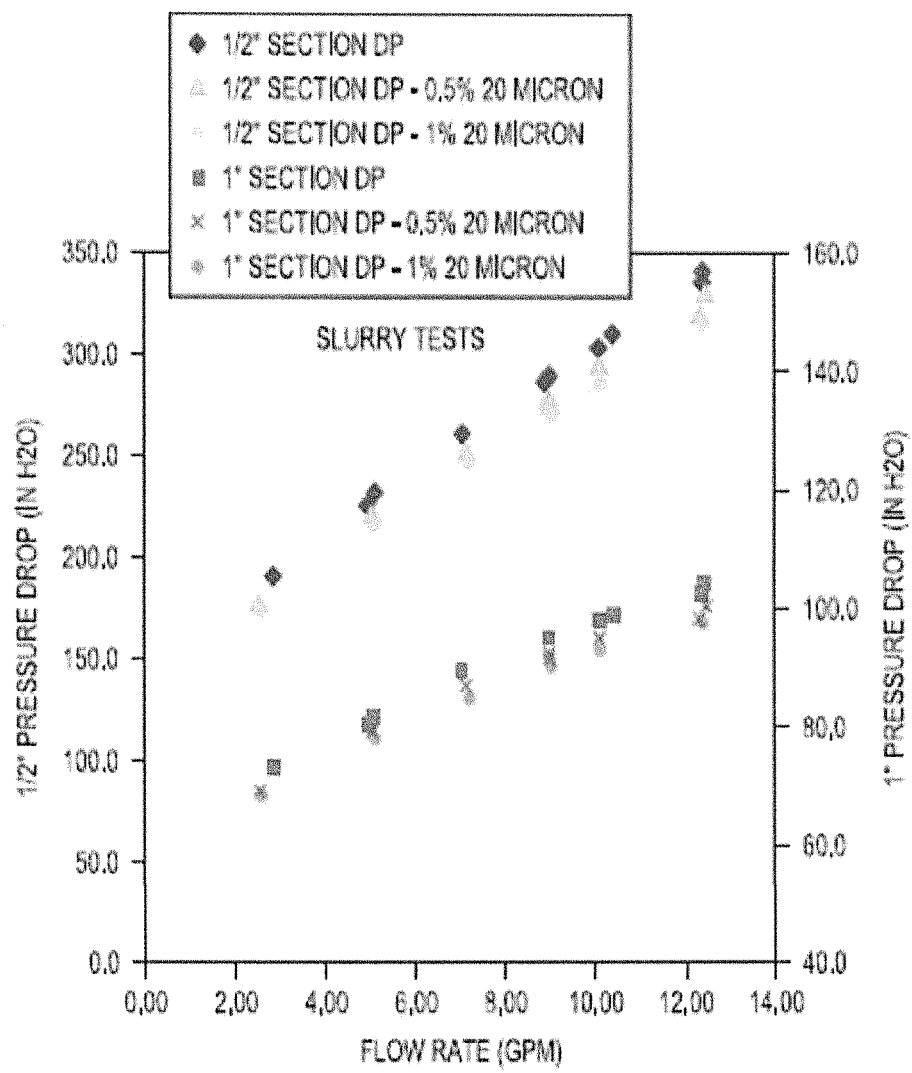
FIG. 11 shows results of a slurry test.
Figure 12:
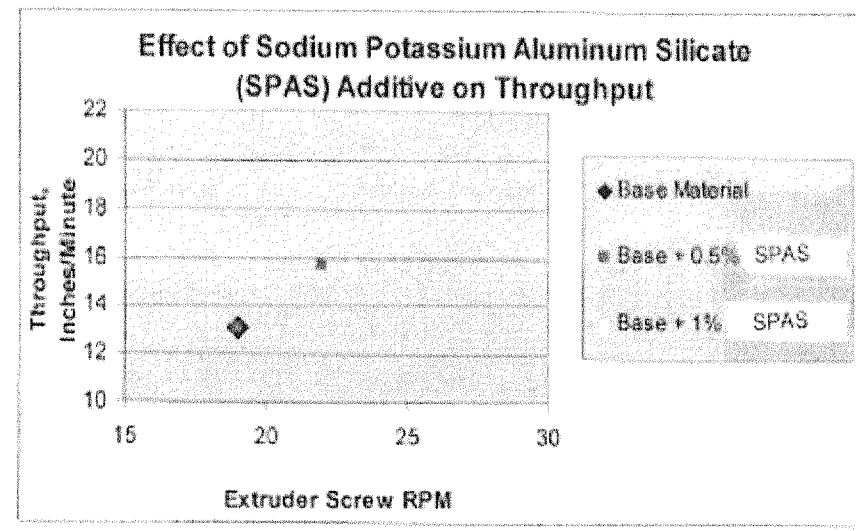
FIG. 12 is a graph showing the effect of Sodium potassium aluminum silicate (Rheolite 800 powder) additive on throughput of thermoplastic through an extruder.
Figure 13:
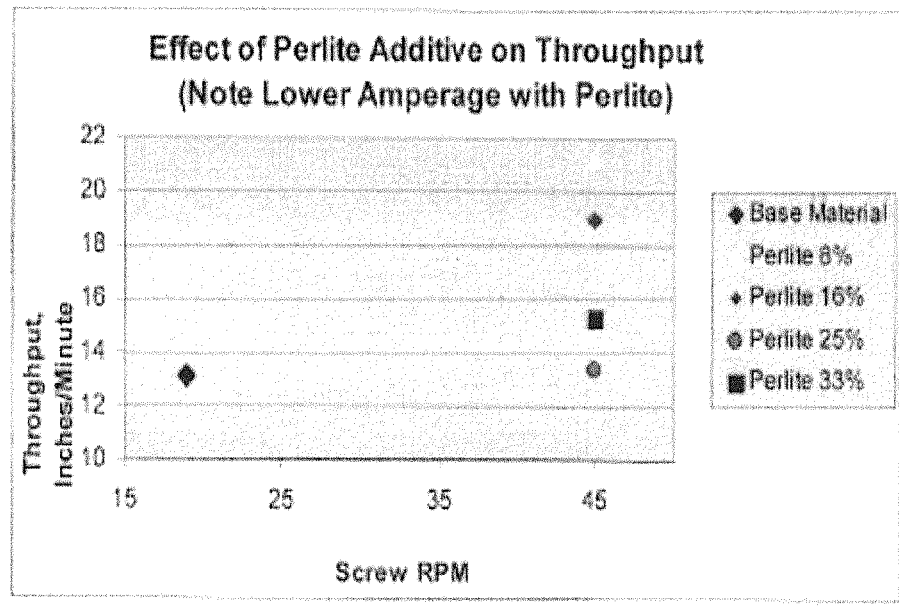
FIG. 13 is a graph showing the effect of increasing loading using Perlite additive on throughput of thermoplastic through an extruder.
Figure 14:
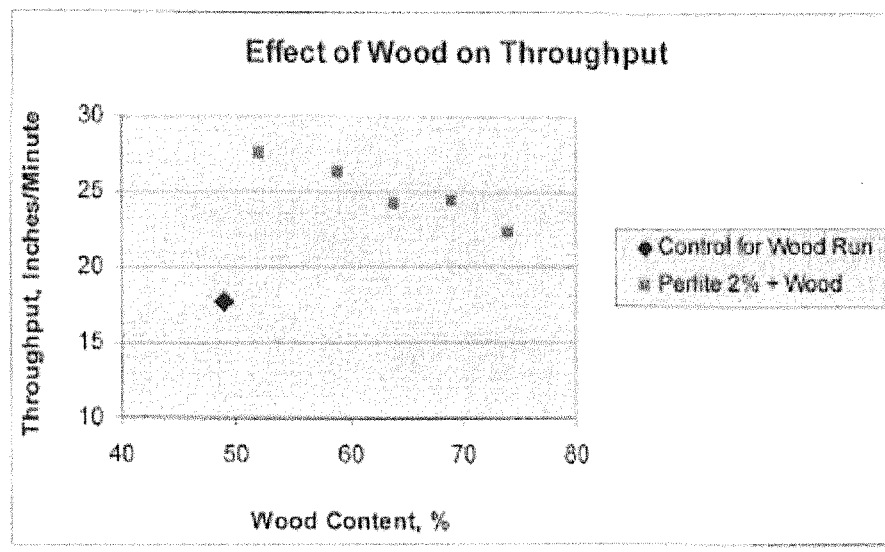
FIG. 14 is a graph showing the effect of increasing loading of wood particles while maintaining a 2 wt % Perlite additive loading on throughput of thermoplastic through an extruder.
Figure 15:
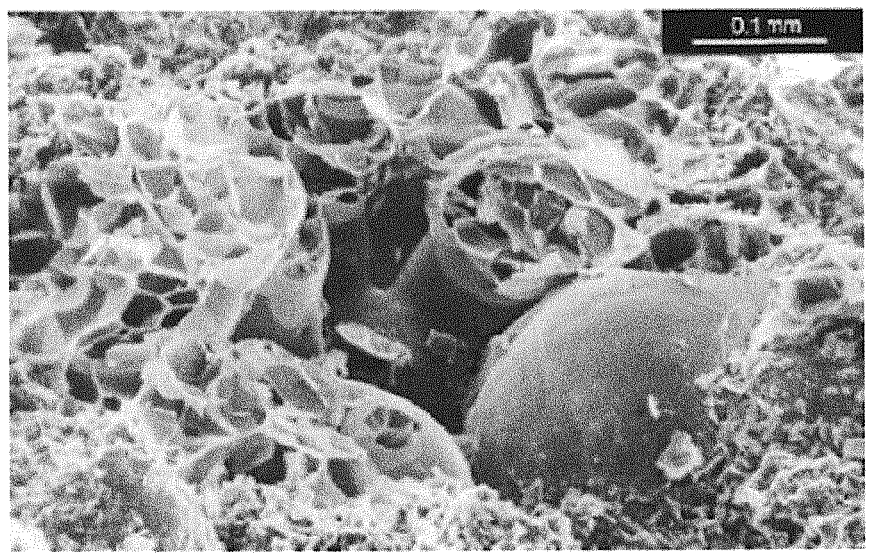
FIG. 15 is an SEM image of unprocessed expanded perlite, categorized as a kinetic particle Type I.
Figure 16:
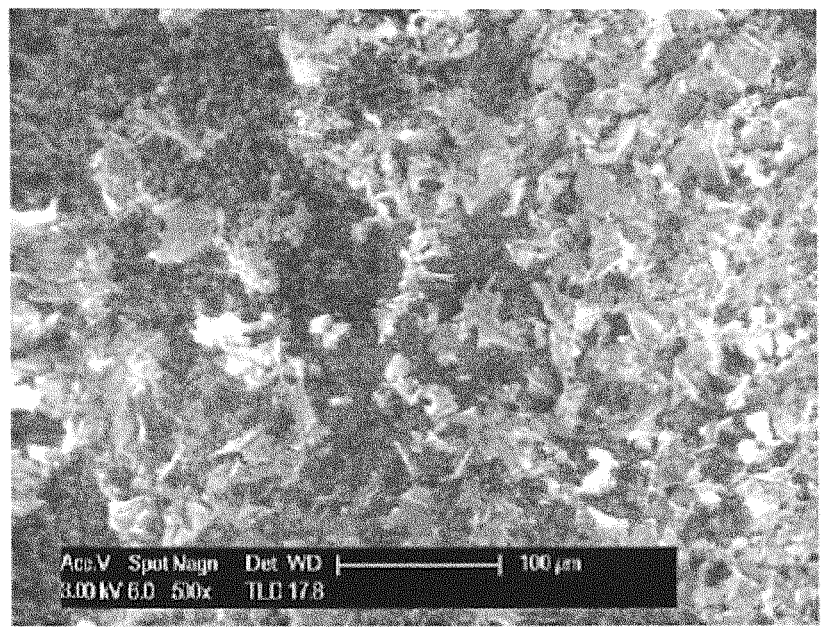
FIG. 16 is an SEM image of processed perlite at 500× magnification.
Figure 17:
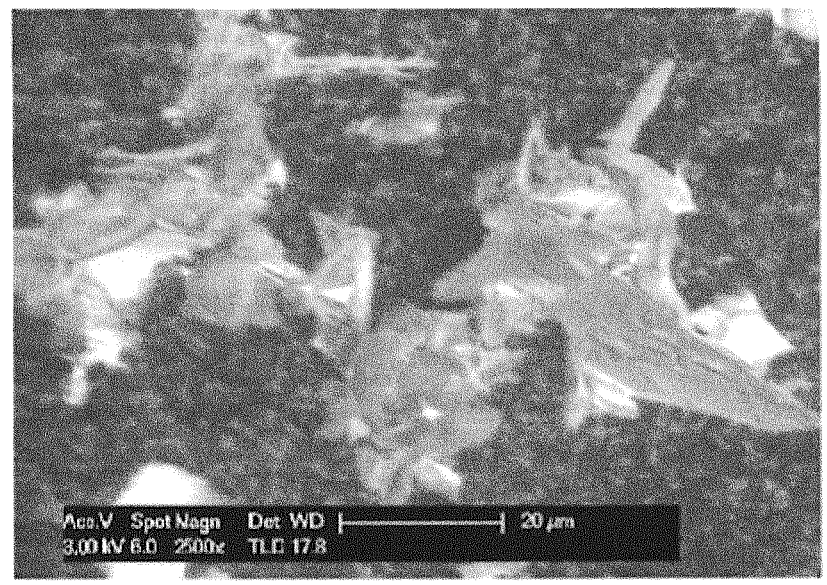
FIG. 17 is an SEM image of processed perlite at 2500× magnification.
Figure 18:
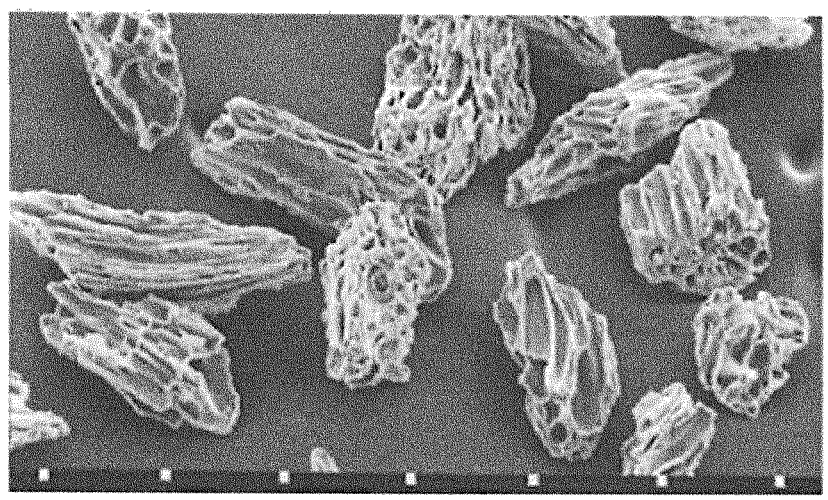
FIG. 18 is an SEM image of volcanic ash wherein each tick mark equals 100 microns.
Figure 19:
FIG. 19 is an SEM image of volcanic ash wherein each tick mark equals 50 microns.
Figure 20A:
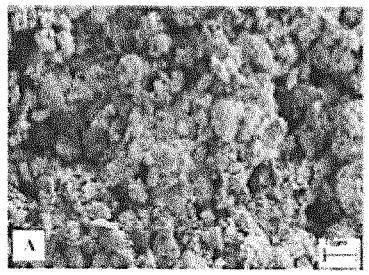
FIG. 20A is an SEM image of natural zeolite-templated carbon produced at 700° C.
Figure 20B:
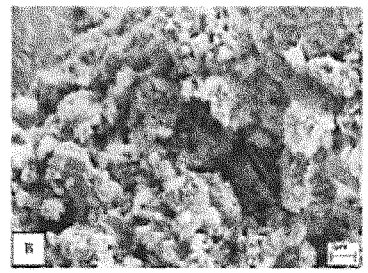
FIG. 20B is an SEM image of natural zeolite-templated carbon produced at 800° C.
Figure 20C:
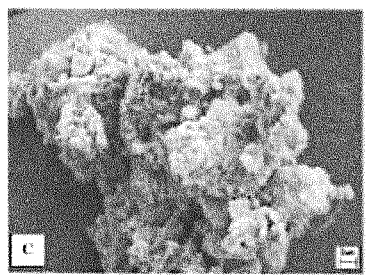
FIG. 20C is an SEM image of natural zeolite-templated carbon produced at 900° C.
Figure 20D:
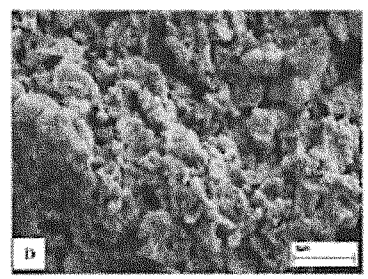
FIG. 20D is an SEM image of natural zeolite-templated carbon produced at 1,000° C.
Figure 21:
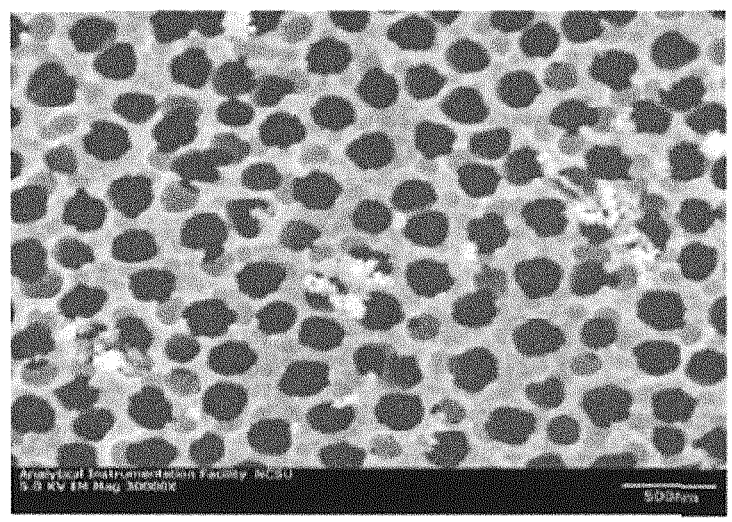
FIG. 21 is an SEM image of nano porous alumina membrane at 30000× magnification.
Figure 22:
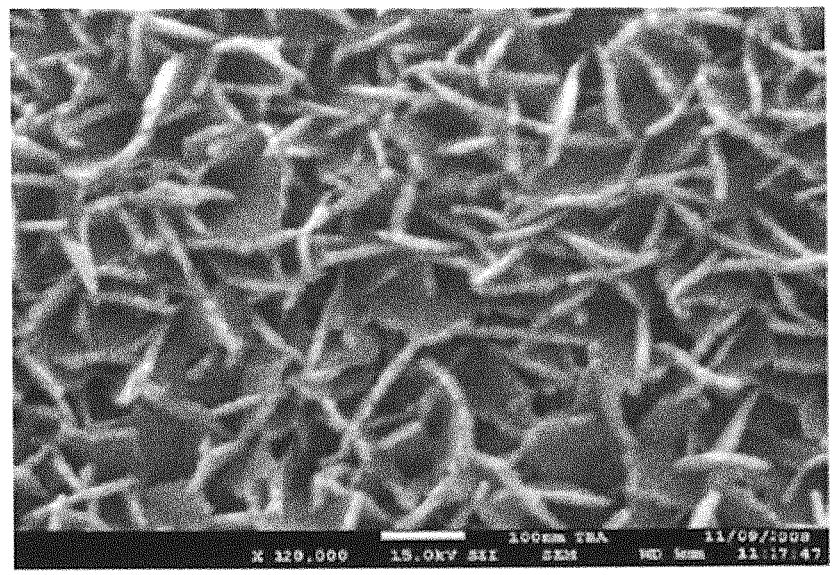
FIG. 22 is an SEM image of pseudoboehmite phase $Al_2O_3 \cdot xH_2O$ grown over aluminum alloy AA2024-T3 at 120,000 magnification.
Figure 23:
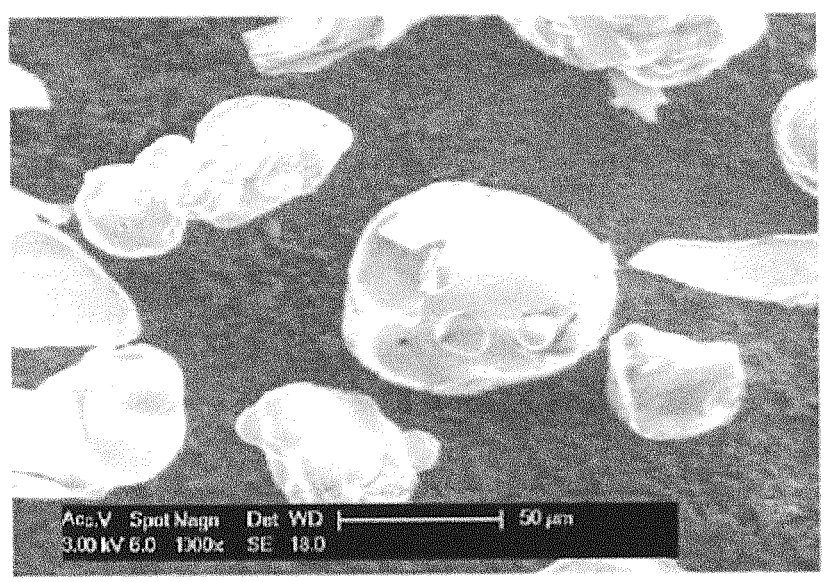
FIG. 23 is an SEM image of unprocessed hollow ash spheres, categorized as a kinetic particle Type II, at 1000× magnification wherein the majority of hollow sphere materials can undergo a mechanical shaping in order to produce egg shell like fragments with surface characteristics to promote kinetic boundary layer mixing.

FIG. 10 shows the effect the adding kinetic boundary layer mixing particles on dissimilar materials that are difficult to mix. In an extruder, the PVC and ABS are mixed together, which resulted in the ABS acting like a black pigment.

Typically, additives in polymers are used to promote durability. However, in the case of fire retardants, fillers, defoamers, surface tension modifiers and biocides etc., fillers often have a negative effect on the polymer, which produces fatigue throughout the cross-linked polymer system. The addition of kinetic mixing particles does more than improve mixing. The addition of kinetic mixing particles mechanically reduces the size of additives, which produces better interaction in the polymer matrix. Therefore, by reducing the size of additives and improving dispersion, the amount of additives can be reduced. This homogenous mixing characteristic increases cross-linking strength of the polymer by reducing the amount of additives needed to produce the desired result.

In a reactive two-component foam, the addition of kinetic mixing particles will help mix the liquid-to-liquid interface, which promotes better cross linking throughout the polymer. The additive of kinetic mixing particles will additionally improve adhesive strength and impart better flow properties.

Some particles may change their physical size, i.e., break up, while still maintaining the desirable dynamic surface characteristics previously mentioned for facilitating kinetic boundary layer mixing. For example, particles that may be too large can be swept off of the boundary layer and into the main fluid flow where the particles can undergo fracturing due to high pressures and fluid turbulence. Fracturing will reduce the size of the particles. After dispersing, appropriately sized particles will migrate towards the boundary layer because of fluid dynamics where the particles will come into contact with the sticky or gluey region of the boundary layer to promote kinetic boundary layer mixing. In conjunction with this example, particle sizing, i.e., fracturing, may also take place in the boundary layer against mechanical surfaces caused by fluid impacting pressures. The boundary layer kinetic mixing particles undergoing high shear during normal process conditions may self-shape due to extreme forces. This self-shaping will result in micro tailoring of the starting geometric surface characteristics, which will enhance the specialized three-dimensional surface characteristics to promote tumbling or rolling in the boundary layer.

Filler particles should be sized proportionally with respect to the boundary layer region. The size is usually defined arbitrarily as the point where $u=0.99U$. Therefore, a theoretical starting diameter of a particle is the height measured perpendicular to the surface where $u=0.99U$. There are many factors that add difficulties when calculating parameters associated with kinetic mixing in the boundary zone, for example:

1. The amount of filler loading, which produces modified boundary layer interaction.
2. Heat transfer through the walls, which create viscosity differentials.
3. Shear effects and continually increased compression induced by screw agitation.
4. Chemical reactions where materials are changing physical properties such as viscosities, density and etc.

The dynamics associated with mixing is one of the most complex mechanical chemical interactions in the process industry. Particle size will vary from product to product and optimization may or may not be needed.

The chemical industry has produced test methods and tables for homogeneous liquid and boundary layer relative thicknesses for calculating fluid flow properties. These test methods and tables are useful for selection of mechanical equipment and heat transfer properties. The profile assumption may be used as a starting point for particle size so that particles will function in the boundary layer to increase mixing. Depending on which particle characteristics of surface interaction are selected from the six categories, the starting size of a particle would have a relative diameter 0.1 to 100% of the calculated value of u=0.99U, most preferred 0.3 to 30% of the calculated value of u=0.99U.

Solid particles used for kinetic mixing in a boundary layer, i.e., kinetic boundary layer mixing material or kinetic mixing material, preferably have following characteristics:

- Particles should have a physical geometry characteristic that allows the particle to roll or tumble along a boundary layer surface.
- Particles should have a surface roughness sufficient to interact with a zero velocity zone or a non-slip fluid surface to promote kinetic friction rather than static friction. The mixing efficiency of particles increases with surface roughness.
- Particles should be sufficiently hard so that the fluid is deformed around a particle for promoting kinetic mixing through the tumbling or rolling effect of the particle.
- Particles should be size proportional to the boundary layer of a fluid being used so that the particles roll or tumble due to kinetic rolling friction.
- Particles should not be too small. If the particles are too small, the particles will be caught in the boundary layer and will lose an ability to tumble or roll, which increases friction and promotes mechanical wear throughout the contact zone of the boundary layer.
- Particles should not be too large. If the particles are too large, the particles will be swept into the bulk fluid flow and have a minimal, if any, effect on kinetic boundary layer mixing. The particles should have size and surface characteristics, such as roughness and/or sharp bladelike characteristics, to be able to reconnect in the boundary layer from the bulk fluid during the mixing process.
- Particles should be proportionally sized stay in suspension and not settle out of fluid after a prolonged length of time.
- Particles can be solid or porous materials, manmade or naturally occurring minerals and or rocks with size ranging from 300 μm to 1 nm based on fluid or gas viscosity.

Kinetic Mixing Particles Result in Increased Flow

As set forth in Applicant's patent application 2011/0272156, entitled "Hydraulic Fracturing", incorporated herein by reference, the addition of kinetic mixing particles results in increased fluid flow of low viscosity fluids.

Test results indicate that the lower the viscosity of a fluid, the thinner the boundary layer.

For example, tests were conducted with the same fluid at 0.5% and 1% concentration of the 20-micron kinetic mixing particle of the invention. The fluid has a viscosity of 33.5 cP that is very close to water, which is equivalent in physical properties to most coolants. The results can be seen in the graph of FIG. 11, which shows a lower pressure drop of the flowing fluid when the particles were added. FIG. 11 shows that there is a consistent linear improvement to the flow rate which is contributed to better mixing of the polymer solution by the addition of a kinetic boundary layer mixing particle.

As set forth in Applicant's patent application U.S. Patent Application Publication No. 2010/0093922, entitled "Structurally Enhanced Plastics with Filler Reinforcements," the addition of kinetic mixing particles results in increased fluid flow high viscosity fluids. The application is hereby incorporated by reference.

In particular, FIG. 12 shows that the addition of sodium potassium aluminum silicate additive to a thermoplastic mixture resulted in increased flow. FIG. 13 shows that perlite was added to a thermoplastic mixture in amounts from 8% to 33%, wherein high percentages of perlite resulted in increased flow.

The reason the high percentages of Perlite were chosen was to remove the possibility that this material was just a filler. The edge effects of the three-dimensional knife blades particles interacting with the boundary layer even at 33 wt % still showed an improvement of 19% greater than the base material. Throughputs of the material could have been higher but the rpms limitation on the extruder was 45 and the material was being hand fed that is why we believe at 25% the throughput decreased because of difficulties in feeding such a lightweight material for the first time but by the time we got to 33 wt % we had figured it out.

FIG. 14 shows that the additive of wood content and perlite at 2% to a thermoplastic mixture increased throughput.

The reason this test was chosen was because the loading of a lightweight natural organic filler into an organic petroleum based material increased, the edge effects of poor mixing. There was no maximum throughput reached on 52 wt %, 59 wt %, 64 wt % and 69 wt % because the rpm were at a maximum until 74 wt % at which time the rpm had to be decreased to 30 rpms to prevent edge effects. The compressible fibers in the extrusion process act like broom sweeps along the boundary layer. The wood fiber is a compressible filler whose density goes from 0.4 g/cm$^3$ to 1.2 g/cm$^3$ after extrusion against the wall which have the ability to encapsulate these hard particles in the boundary layer and remove them permanently. It is the effect of the three-dimensional particle shape that holds them in the boundary layer with blades that allow this material to cut softer material and not imbed in the wood fiber, preventing them from being swept away even when the wood fiber is undergoing compression in extrusion process.

The addition of Applicant's particles increases flow of gases and fluids by converting the stagnant film coefficient of drag of the boundary layer to a kinetic coefficient of drag. This is important in today's heat transfer fluids where the trend is to incorporate nanoparticles to increase the thermal conductivity which thereby increases the viscosity and the affects of the boundary layer which reduces the velocity and heat transfer efficiency. Therefore these negative effects can be overcome by the use of the applicant's highly specialized particles.

Physical Geometry of Particles

Particle shapes can be spherical, triangular, diamond, square or etc., but semi-flat or flat particles are less desirable because they do not tumble well. Semi-flat or flat particles tumble less well because the cross-sectional surface area of a flat particle has little resistance to fluid friction applied to its small thickness. However, since agitation in the form of mixing is desired, awkward forms of tumbling are beneficial since the awkward tumbling creates dynamic random generated mixing zones at the boundary layer. Random mixing zones are analogous to mixing zones created by big mixing blades operating with little mixing blades. Some of the blades turn fast and some of the blades turn slow, but the result is that the blades are all mixing. In a more viscous fluid, which has less inelastic properties, kinetic mixing by particles will produce a chopping and grinding effect due to particle surface roughness and due to sharp edges of the particles.

Spherical particles having extremely smooth surfaces are not ideal for the following reasons. First, surface roughness increases friction between the particle and the fluid, which increases the ability of the particle to remain in contact with the sticky and/or the non-slip zone. In contrast, a smooth surface, such as may be found on a sphere, limits contact with the sticky layer due to poor surface adhesion. Second, surface roughness directly affects the ability of a particle to induce mixing through tumbling and/or rolling, whereas a smooth surface does not. Thirdly, spherical shapes with smooth surfaces tend to roll along the boundary layer, which can promote a lubricating effect. However, spherical particles having surface roughness help to promote dynamic mixing of the boundary layer as well as promote lubricating effects, especially with low viscosity fluids and gases.

Particle Type I

Particle type I embeds deep into the boundary layer to produce excellent kinetic mixing of foam constituent fluids in both the boundary layer and in the mixing zone. Type I particles increase dispersion of chemical and mineral additives. Type I particles increase fluid flow. The surface area of Type I particles is large compared to the mass of Type I particles. Therefore Type I particles stay in suspension well. In one example, a type (I) kinetic mixing particle is made from expanded perlite with a Mohs scale hardness of 5.5 (equivalent to a high-quality steel knife blade). For effectiveness, particles of all types preferably have a hardness of 2.5 or higher on the Mohs scale.

Referring to FIG. 15, shown is expanded perlite that is unprocessed. Perlite is a mineable ore with no known environmental concerns and is readily available on most continents and is only surpassed in abundance by sand. Expanded perlite is produced through thermal expansion process which can be tailored to produce a variety of wall thicknesses of the bubbles. Expanded perlite clearly shows thin wall cellular structure and how it will deform under pressure. In one embodiment, perlite may be used in a raw unprocessed form, which is the most economic form of the material. Perlite has an ability to self-shape, i.e., to be crushed into smaller particles, under pressure into boundary layer kinetic mixing particles.

FIG. 16 is an image that demonstrates that the expanded perlite particles do not conglomerate and will flow easily among other process particles. Therefore, expanded perlite particles will easily disperse with minimal mixing equipment.

Referring to FIG. 17, shown is an enlarged image of an expanded perlite particle showing a preferred structural shape for processed perlite particles. The particles may be described as having three-dimensional wedge-like sharp blades and points with a variety of sizes. The irregular shape promotes diverse kinetic boundary layer mixing. The expanded perlite shown in FIG. 17 is extremely lightweight, having a density in the range of 0.1-0.15 g/cm. The low weight allows for minimal fluid velocity to promote rotation of the particle. The blade-like characteristics visible in FIG. 17 easily capture the kinetic energy of the fluid flowing over the boundary layer while the jagged blade-like characteristics visible in FIG. 17 easily pierce into the boundary layer of the flowing fluid to promote agitation while maintaining adherence to the surface of the boundary layer. The preferred approximate application size is estimated to be 900 nm to 50 μm. This kinetic mixing particle produces dispersion in a variety of fluids have a wide range of viscosities. Additionally, the expanded perlite particle is an excellent nucleating agent in foaming processes.

Referring now to FIG. 18, shown is volcanic ash in its natural state. Volcanic ash exhibits similar characteristics to the characteristics of expanded perlite, discussed above, regarding the thin walled cellular structures. Volcanic ash is a naturally formed material that is readily mineable and that can be easily processed into a kinetic mixing material that produces kinetic boundary layer mixing. The volcanic ash material is also deformable, which makes it an ideal candidate for in-line processes to produce desired shapes either by mixing or pressure application.

Referring now to FIG. 19, shown is a plurality of crushed volcanic ash particles. FIG. 19 illustrates a crushed particle form having three-dimensional bladelike characteristics that will interact in the boundary layer in a similar manner to expanded perlite, discussed above, in its processed formed. The crushed volcanic ash particles of FIG. 19 are larger than the processed perlite, making application of crushed volcanic ash particles more appropriate to higher viscosity materials. The preferred approximate application size is estimated to be between 80 μm to 30 μm. This material will function similar to the processed perlite materials discussed above.

Referring now to FIGS. 20A-20D, shown is natural zeolite-templated carbon produced at 700° C. (FIG. 20A), 800° C. (FIG. 20B), 900° C. (FIG. 20C), and 1000° C. (FIG. 20D). Zeolite is a readily mineable material with small pore sizes that can be processed to produce desired surface characteristics of kinetic mixing material. Processed perlite and crushed volcanic ash have similar boundary layer interaction capabilities. Zeolite particles have small porosity and can, therefore, produce active kinetic boundary layer mixing particles in the nano range. The preferred approximate application size is estimated to be between 600 nm to 900 nm. Zeolite particles are ideal for friction reduction in medium viscosity materials.

Referring now to FIG. 21, shown is a nano porous alumina membrane having a cellular structure that will fracture and create particle characteristics similar to any force material. Material fractures will take place at the thin walls, not at the intersections, thereby producing characteristics similar to the previously discussed materials, which are ideal for boundary layer kinetic mixing particles. The preferred approximate application size is estimated to be between 300 nm to 500 nm. The particle sizes of this material are more appropriately applied to medium to low viscosity fluids.

Referring now to FIG. 22, shown is a pseudoboehmite phase $Al_2O_3xH_2O$ grown over aluminum alloy AA2024-T3. Visible are bladelike characteristics on the surface of processed Perlite. The fracture point of this material is at the thin blade faces between intersections where one or more blades join. Fractures will produce a three-dimensional blade shape similar to a "Y", "V" or "X" shape or similar combinations of geometric shapes. The preferred approximate application size is estimated to be from 50 nm to 150 nm.

Particle Type II

Particle type II achieves medium penetration into a boundary layer for producing minimal kinetic boundary layer mixing and minimal dispersion capabilities. Type II particles result in minimal fluid flow improvement and are easily suspended due to the large surface and extremely low mass of Type II particles.

The majority of materials that form hollow spheres can undergo mechanical processing to produce egg shell-like fragments with surface characteristics to promote kinetic boundary layer mixing.

Referring now to FIG. 23, shown is an image of unprocessed hollow spheres of ash. Ash is mineable material that can undergo self-shaping to produce kinetic boundary layer mixing particle characteristics depending on process conditions. The preferred approximate application size is estimated to be 20 μm to 80 μm prior to self-shaping processes. Self-shaping can be achieved either by mechanical mixing or pressure, either of which produce a crushing effect.

Figure 24:
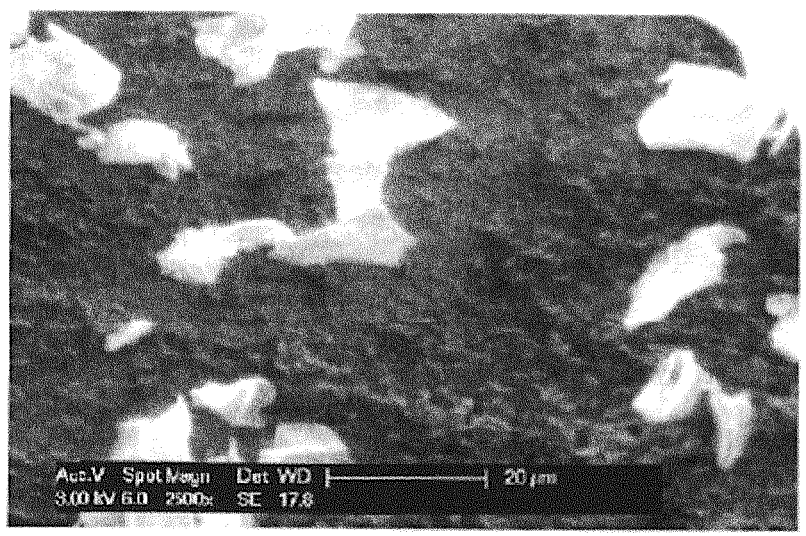
FIG. 24 is an SEM image of processed hollow ash spheres at 2500× magnification.

Referring now to FIG. 24, shown are processed hollow spheres of ash. The fractured ash spheres will tumble in a boundary layer similar to a piece of paper on a sidewalk. The slight curve of the material is similar to a piece of egg shell in that the material tends to tumble because of its light weight and slight curvature. Preferred approximate application size is estimated to be between 5 nm to 50 nm. Ash spheres will function in a manner similar to expanded perlite but the material possesses an inferior disbursing capability because its geometric shape does not allow particles to become physically locked into the boundary layer due to the fact that two or more blades produces more resistance and better agitation as a particle tumbles along the boundary layer. This material reduces friction between flowing fluid and the wall of pipe or process equipment during the flow of heavy viscosity materials.

Figure 25:
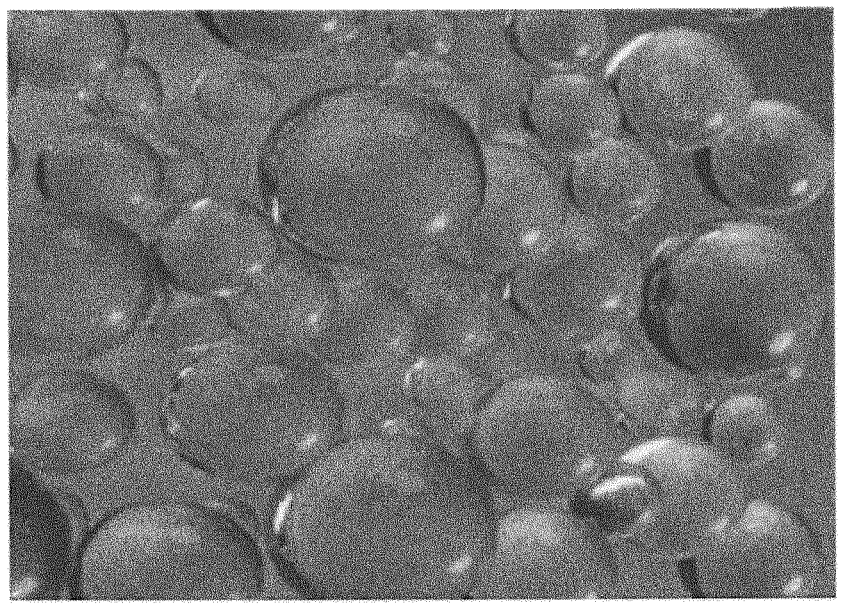
FIG. 25 is an SEM image of 3M® glass bubbles, which can be produced into broken eggshell like structures in order to produce surface characteristics to promote boundary layer mixing.
Figure 28:
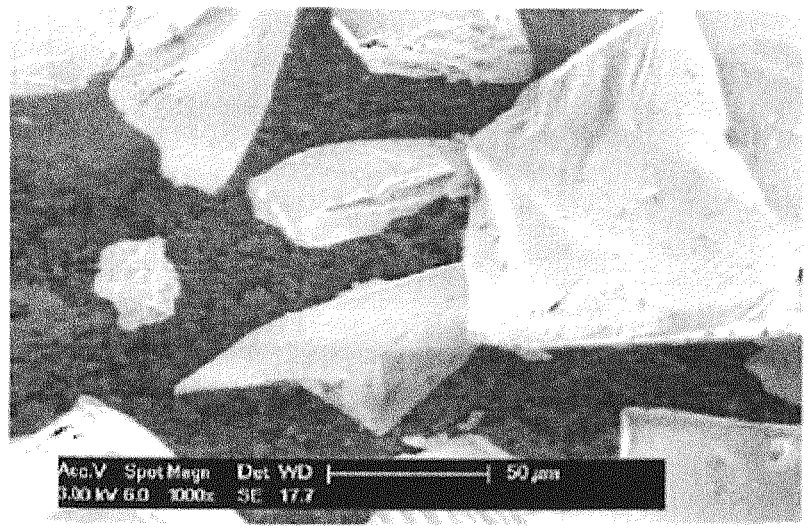
FIG. 28 is an SEM image of recycled glass at 1,000× magnification.
Figure 29:
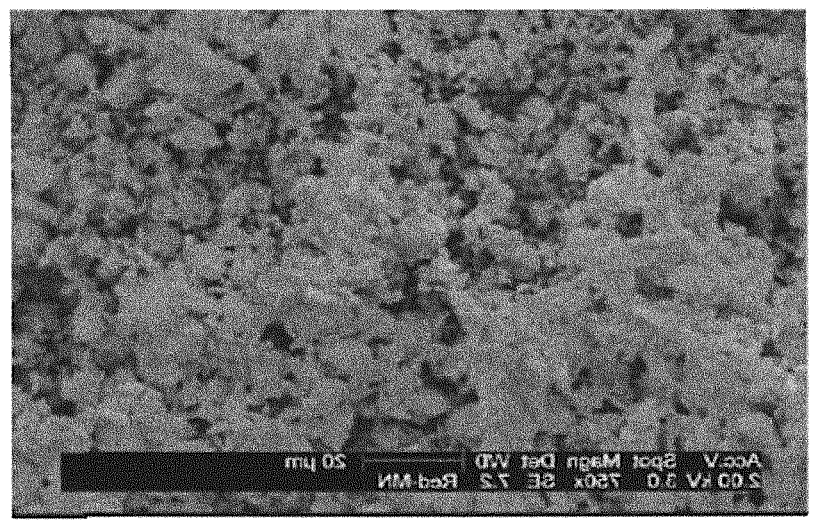
FIG. 29 is an SEM image of processed red volcanic rock at 750× magnification.
Figure 30A:
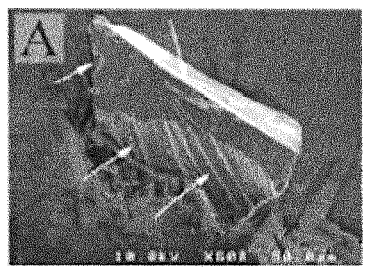
FIG. 30A is an SEM images of sand particles that have the ability to fracture, which produces appropriate surface characteristics for kinetic boundary layer mixing particles.
Figure 30B:
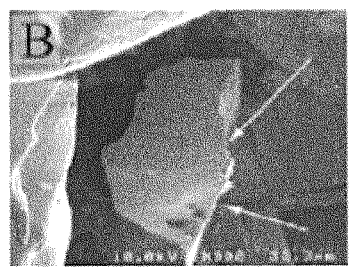
FIG. 30B is an SEM image of sand particles that have the ability to fracture, which produces appropriate surface characteristics for kinetic boundary layer mixing particles.
Figure 30C:
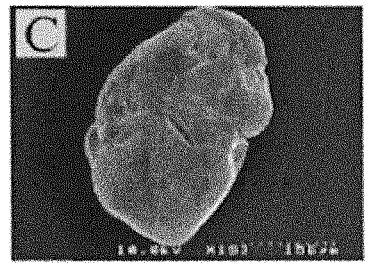
FIG. 30C is an SEM image of sand particles that have the ability to fracture, which produces appropriate surface characteristics for kinetic boundary layer mixing particles.
Figure 30D:
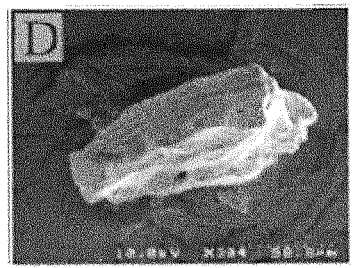
FIG. 30D is an SEM image of sand particles that have the ability to fracture, which produces appropriate surface characteristics for kinetic boundary layer mixing particles.
Figure 31A:
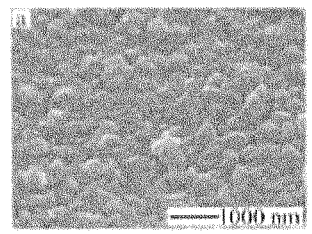
FIG. 31A is an SEM image of zeolite Y, A and silicate 1 synthesized for 1 hour.
Figure 31B:
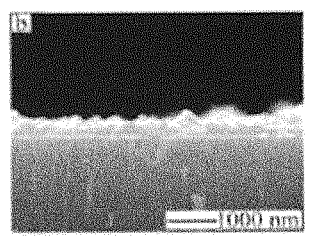
FIG. 31B is an SEM image of zeolite Y, A and silicate 1 synthesized for 1 hour.
Figure 31C:
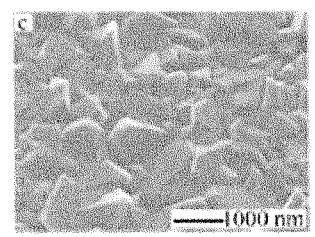
FIG. 31C is an SEM image of zeolite Y, A and silicate 1 synthesized for 6 hours.
Figure 31D:
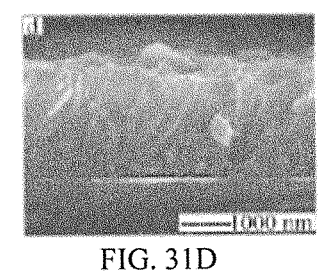
FIG. 31D is an SEM image of zeolite Y, A and silicate 1 synthesized for 6 hours.
Figure 31E:
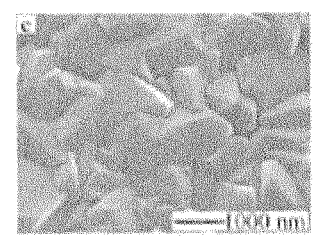
FIG. 31E is an SEM image of zeolite Y, A and silicate 1 synthesized for 12 hours.
Figure 31F:
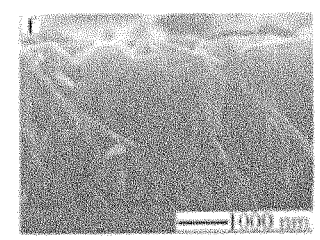
FIG. 31F is an SEM image of zeolite Y, A and silicate 1 synthesized for 12 hours.

Referring now to FIG. 25, shown are 3M® glass bubbles that can be processed into broken eggshell-like structures to produce surface characteristics that promote kinetic boundary layer mixing. The broken glass bubble particles are similar in performance and application to the ash hollow spheres except that the wall thickness and diameter, as well as strength, can be tailored based on process conditions and raw material selections. These man-made materials are suitable for use in food grade applications. The preferred application size is estimated to be from approximately 80 μm to 5 μm prior to self-shaping processes. Self-shaping may be accomplished either by mechanical mixing or by pressure that produce a crushing effect.

Referring now to FIG. 26, shown is an SEM photograph of fly ash particles×5000 (FIG. 26A) and zeolite particles× 10000 (FIG. 26B). The particles comprise hollow spheres. Fly ash is a common waste product produced by combustion. Fly ash particles are readily available and inexpensive. Zeolite can be mined and made by an inexpensive synthetic process to produce hundreds of thousands of variations. Therefore, desirable characteristics of a structure derived from a hollow zeolite sphere can be selected. The zeolite particle shown is a hybrid particle, in that the particle will have surface characteristic similar to processed perlite and the particle retains a semi-curved shape, i.e., an egg shell shape similar to that of a crushed hollow sphere. The preferred approximate application size is estimated to be from 5 μm to 800 nm prior to self-shaping processes. Self-shaping may be accomplished either by mechanical mixing or by pressure to produce a crushing effect. The small size of these particles makes the particles ideal for use in medium viscosity materials.

Particle Type III

Particles categorized as Particle type III exhibit minimal penetration into a boundary layer. Type III particles exhibit minimal kinetic mixing in the boundary layer and have excellent dispersion characteristics with both soft chemical and hard mineral additives. Type III particles increase fluid flow and do not suspend well but are easily mixed back into suspension. Some solid materials have the ability to produce conchordial fracturing to produce surface characteristics that promote kinetic boundary layer mixing.

Referring now to FIGS. 27 and 28, shown are images of recycled glass. Recycled glass is a readily available man-made material that is inexpensive and easily processed into kinetic boundary layer mixing particles. The sharp bladelike characteristics of the particles are produced by conchordial fracturing similar to a variety of other mineable minerals. The bladelike surfaces of these particles are not thin like perlite. The density of the particles is proportional to the solid from which the particles are made. The sharp blades interact with a fluid boundary layer of a flowing fluid in a manner similar to the interaction of perlite except that the recycled glass particles typically require a viscous material and a robust flow rate to produce rotation. Processed recycled glass has no static charge. Therefore, recycled glass produces no agglomeration during dispersion. However, because of its high density, recycled glass particles can settle out of the fluid easier than other low-density materials. The preferred approximate application sizes are estimated to be between 5 μm to 200 μm. This material produces good performance in boundary layers of heavy viscosity fluids with high flow rates. This kinetic mixing particle produces dispersion. The smooth surface of the particles reduces friction.

Referring now to FIG. 29, shown is an image of processed red lava volcanic rock particles. Lava is a readily available mineable material. A typical use for lava is for use as landscape rocks in the American Southwest and in California. This material undergoes conchordial fracturing and produces characteristics similar to recycled grass. However, the fractured surfaces possess more surface roughness than the smooth surface of the recycled glass. The surface characteristics produce a slightly more grinding effect coupled with bladelike cutting of a flowing fluid. Therefore, the particles not only tumble, they also have an abrasive effect on a fluid stream. The volcanic material disperses semi-hard materials throughout viscous mediums such as fire retardants, titanium dioxide, calcium carbonate, etc. The preferred approximate application sizes are estimated to be between 1 μm to 40 μm. Processed volcanic rock produces good performance in the boundary layer of flowing heavy viscosity materials at high flow rates and produces dispersion.

Referring now to FIGS. 30A-30D, FIGS. 30A-30C show sand particles that have the ability to fracture and to produce appropriate surface characteristics for use as kinetic boundary layer mixing particles. The images show particles having similar physical properties to properties of recycled glass, which produces similar benefits. FIGS. 30A, 30B, and 30D have good surface characteristics for interacting with the boundary layer of a flowing fluid even though the surface characteristics shown in the figures are different. FIG. 30A shows some bladelike characteristics having good surface roughness along edges of the particle to promote boundary layer surface interaction. The particles of FIG. 30A will require higher velocity flow rates to produce tumbling. The particles of FIG. 30B have similar surface characteristics to the surface characteristics of recycled glass as discussed previously. FIG. 30D shows particles having a good surface roughness to promote interaction similar to the interaction of these materials generally. The performance of these particles is similar to the performance of recycled glass. Sand is an abundant material that is mineable and can be processed inexpensively to produce desired fractured shapes in a variety of sizes. Sand is considered environmentally friendly because it is a natural material. The preferred approximate application sizes are estimated to be between 5 μm to 250 μm. This material produces good performance in the boundary layers of heavy viscosity materials at high flow rates. This kinetic mixing particle produces dispersion. The smooth surface of the particles reduces friction.

Referring now to FIGS. 31A-31F, shown are images of zeolite Y, A and silicate-1. SEM images of films are shown that have been synthesized for 1 hour (FIGS. 31A, 31B), 6 hours (FIGS. 31C, 31D) and 12 hours (FIGS. 31E, 31F) in the bottom part of a synthesis solution at 100° C. These materials can be processed to produce nano sized kinetic boundary layer mixing particles. This material is synthetically grown and is limited in quantity and, therefore, tends to be expensive. All six images, i.e., FIGS. 31A-31F clearly show the ability of this material to produce conchordial fracturing with bladelike structures similar to the structures mentioned above. The preferred approximate application size is estimated to be between 500 nm to 1000 nm. The particle size range of this material makes it useful in medium viscosity fluids.

Figure 32:
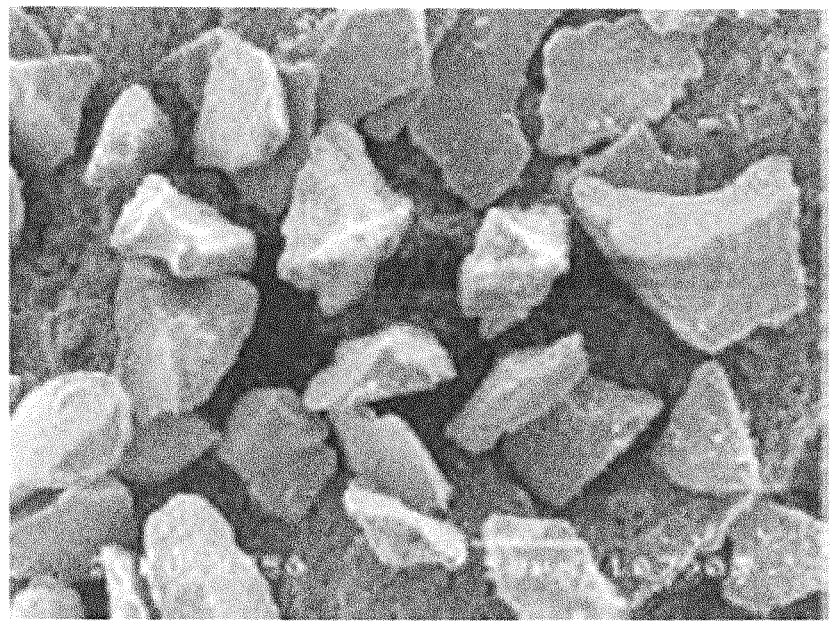
FIG. 32 is an SEM image of phosphocalcic hydroxyapatite formula $Ca_{10}(PO_4)_6(OH)_2$, which forms part of the crystallographic family of apatites, isomorphic compounds with the same hexagonal structure. This is the calcium phosphate compound most commonly used for biomaterial. Hydroxyapatite is mainly used in the medical sector.

Referring now to FIG. 32, shown is phosphocalcic hydroxyapatite, formula $Ca_{10}(PO_4)_6(OH)_2$, which forms part of the crystallographic family of apatites, which are isomorphic compounds having the same hexagonal structure. This is the calcium phosphate compound most commonly used for biomaterial. Hydroxyapatite is mainly used for medical applications. The surface characteristics and performance are similar to those of red lava particles, discussed above, but may possess a better surface roughness than red lava particles.

Particle Type IV

Some solid clustering material have the ability to produce fracturing of the cluster structure to produce individual unique uniform materials that produce surface characteristics that promote kinetic boundary layer mixing.

Figure 33A:
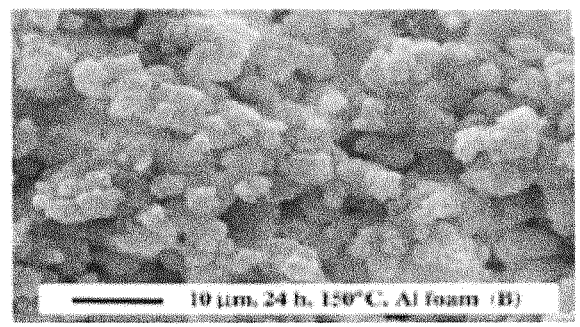
FIG. 33A is an SEM image of Al MFI agglomerates, categorized as a kinetic particle Type IV, wherein some solid clustering materials have the ability to produce fracturing of the cluster structure to produce individual unique uniform materials that produce surface characterization to promote kinetic boundary layer mixing.
Figure 33B:
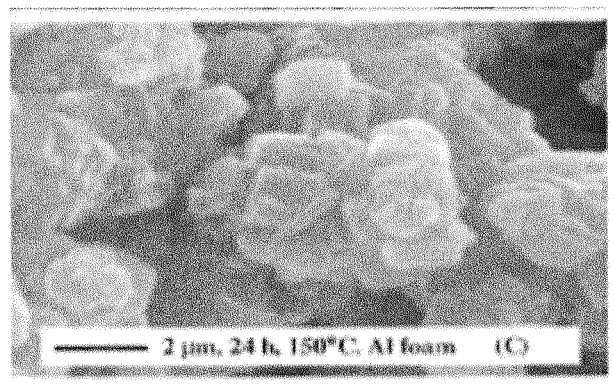
FIG. 33B is an SEM image of Al MFI agglomerates, categorized as a kinetic particle Type IV, wherein some solid clustering materials have the ability to produce fracturing of the cluster structure to produce individual unique uniform materials that produce surface characterization to promote kinetic boundary layer mixing.
Figure 34A:
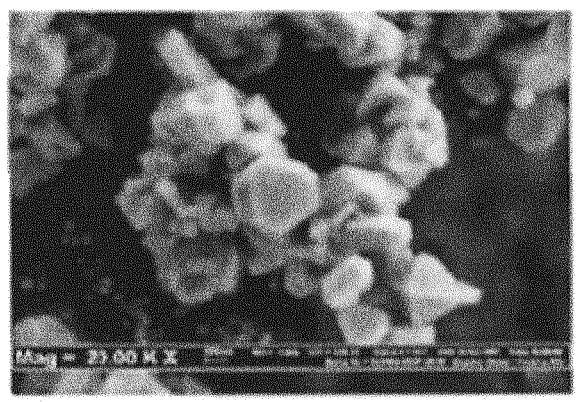
FIG. 34A is an SEM image of microcrystalline zeolite Y at 20 k× magnification.
Figure 34B:
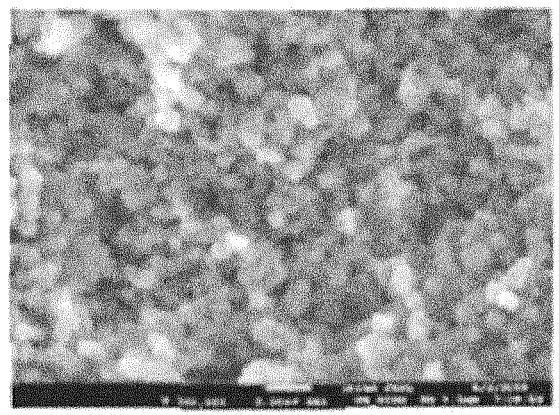
FIG. 34B is an SEM image of microcrystalline zeolite Y at 100 k× magnification.
Figure 35:
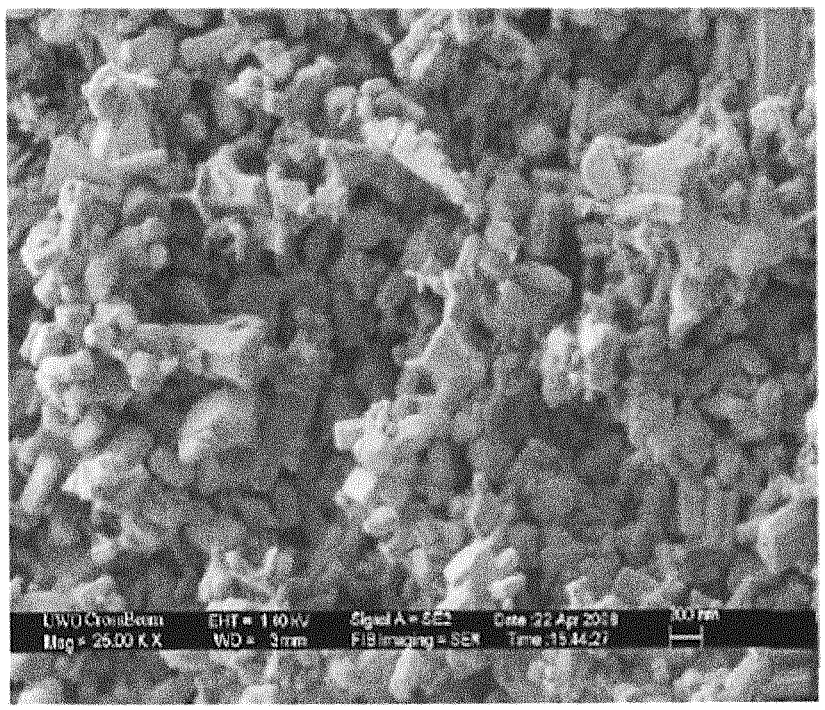
FIG. 35 is an SEM image of ZnO, 50~150 nm hydrophilic.
Figures 36A, 36B:
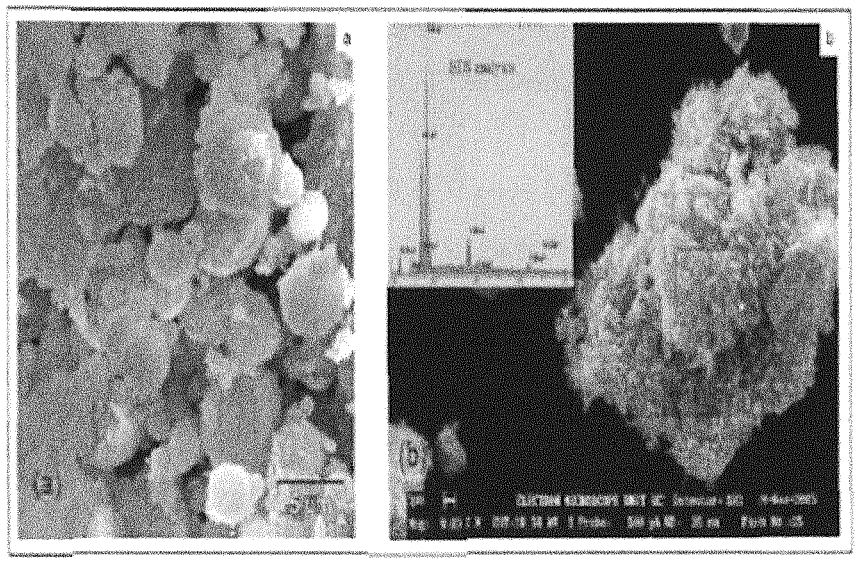
FIG. 36A is an SEM image of solid residues of semi-spherical clustering material, categorized as a kinetic particle Type V, wherein some hollow or solid semi-spherical clustering material with aggressive surface morphology (roughness, groups, striations, and hair-like fibers) promote excellent adhesion to the boundary layer with the ability to roll freely and can be used in low viscosity fluids and phase change materials (liquid to gas and gas to liquid). They possess the desired surface characteristics to promote boundary layer kinetic mixing.
FIG. 36B is an SEM image of zeolite-P synthesized at 100° C., categorized as a kinetic particle Type V, wherein some hollow or solid semi-spherical clustering material with aggressive surface morphology (roughness, groups, striations, and hair-like fibers) promote excellent adhesion to the boundary layer with the ability to roll freely and can be used in low viscosity fluids and phase change materials (liquid to gas and gas to liquid). They possess the desired surface characteristics to promote boundary layer kinetic mixing.

Referring now to FIGS. 33A and 33B, shown are SEM images of Al foam/zeolite composites after 24 hours crystallization time at different magnifications. FIG. 33A shows an Al form/zeolite strut. FIG. 33B shows MFI agglomerates. The two images show an inherent structure of this material that will readily fracture upon mechanical processing to produce irregular shaped clusters of individual uniquely formed particles. The more diverse a material's surface characteristics, the better the material will interact with the sticky non-slip zone of a boundary layer of a flowing fluid to produce kinetic boundary layer mixing. This material possesses flowerlike buds with protruding random 90° corners that are sharp and well defined. The corners will promote mechanical agitation of the boundary layer. The particles also have a semi-spherical or cylinder-like shapes that will allow the material to roll or tumble while maintaining contact with the boundary layer due to the diverse surface characteristics. The preferred approximate application size of the particles is estimated to be between 1 µm to 20 µm. This material could be used in a high viscosity fluid. The surface characteristics will produce excellent dispersion of hardened materials such as fire retardants, zinc oxide, and calcium carbonate. As particles of Al foam/Zeolite composites are is rolled, the block-like formation acts like miniature hammer mills that chip away at materials impacting against the boundary layer in flowing fluid.

Referring now to FIGS. 34A and 34B, shown is an SEM image of microcrystalline zeolite Y (FIG. 34A) and an SEM image of nanocrystalline zeolite Y (FIG. 34B). The particles have all the same characteristics on the nano level as those mentioned in the foam/zeolite, above. In FIG. 34A, the main semi-flat particle in the center of the image is approximately 400 nm. In FIG. 34B, the multifaceted dots are less than 100 nm in particle size. Under mechanical processing, these materials can be fractured into diverse kinetic boundary layer mixing particles. The preferred approximate application size is estimated for the cluster material of FIG. 34A to be between 400 nm and 10 μm and for cluster material of FIG. 34B to be between 50 nm to 150 nm. Under high mechanical sheer, these clustering materials have the ability to self-shape by fracturing the most resistant particle that is preventing the cluster particle from rolling easily. Due to their dynamic random rotational ability, these cluster materials are excellent for use as friction modifiers in flowing fluid.

Referring now to FIG. 35, shown are zinc oxide particles of 50 nm to 150 nm. Zinc oxide is an inexpensive nano powder that can be specialized to be hydrophobic or to be more hydrophilic depending on the desired application. Zinc oxide forms clusters having extremely random shapes. This material works very well due to its resulting random rotational movement in a flowing fluid. The particles have diverse surface characteristics with 90° corners that create bladelike characteristics in diverse shapes. Surface characteristics include protruding arms that are conglomerated together in various shapes such as cylinders, rectangles, cues, Y-shaped particles, X-shaped particles, octagons, pentagon, triangles, diamonds etc. Because these materials are made out of clusters having diverse shapes the materials produce enormous friction reduction because the boundary layer is churned to be as close to turbulent as possible by diverse mechanical mixing while still maintaining a laminar fluid flow.

Particle Type V

Particles of Type V result in medium penetration into the boundary layer. Type V particles create medium kinetic mixing of the boundary layer similar to a leaf rake on dry ground. Type V particles have excellent adhesive forces to the gluey region of the boundary layer, which is required for two-phase boundary layer mixing. Particle of Type V produce minimal dispersion of additives. Therefore, addition of Type V particles increases fluid flow and the particles will tend to stay in suspension. Some hollow or solid semi-spherical clustering material with aggressive surface morphology, e.g., roughness, groups, striations and hair-like fibers, promote excellent adhesion to the boundary layer with the ability to roll freely and can be used in low viscosity fluids and phase change materials, e.g., liquid to a gas and gas to a liquid. Type V particles possess the desired surface characteristics to promote boundary layer kinetic mixing.

Referring now to FIGS. 36A and 36B, shown is a scanning electron micrograph of solid residues (FIG. 36A) and a scanning electron micrograph and energy dispersive spectroscopy (EDS) area analysis of zeolite-P synthesized at 100° C. Unlike the cluster materials discussed in particle type IV, these materials have a spherical shape and a surface roughness that may be created by hair-like materials protruding from the surface of the particles. FIG. 36A shows a particle that possesses good spherical characteristics. A majority of the spheres have surface roughness that is created by small connecting particles similar to sand grains on the surface. FIG. 36B shows a semi-circular particle that has hair-like fibers protruding from the entire surface. These characteristics promote good, but not excellent, adhesion to the boundary layer. These materials roll freely on the surface of the boundary layer to produce minimal mixing to promote kinetic boundary layer mixing in a two-phase system. For example, as a liquid transitions to a gas in a closed system the boundary layer is rapidly thinning. The particles must stay in contact and roll to promote kinetic boundary layer mixing. The material also must have the ability to travel within the gas flow to recycle back into the liquid to function as an active medium in both phases. These particles have a preferred size range of between approximately 1 μm to 5 μm (FIG. 36A) and from between approximately 20 μm to 40 μm (FIG. 36B). They both would work well in a high pressure steam generation system where the particles would move the stagnant film on the walls of a boiler from conduction toward a convection heat transfer process.

Particle Type VI

Referring now to FIGS. 37A, 37B, and 37C, shown are nanostructured CoOOH hollow spheres that are versatile precursors for various cobalt oxide datives (e.g. $Co_3O_4$, $LiCoO_2$)

and also possess excellent catalytic activity. CuO is an important transition metal oxide with a narrow bandgap (e.g., 1.2 eV). CuO has been used as a catalyst, a gas sensor, and in anode materials for Li ion batteries. CuO has also been used to prepare high temperature superconductors and magnetoresistance materials.

Figure 38A:
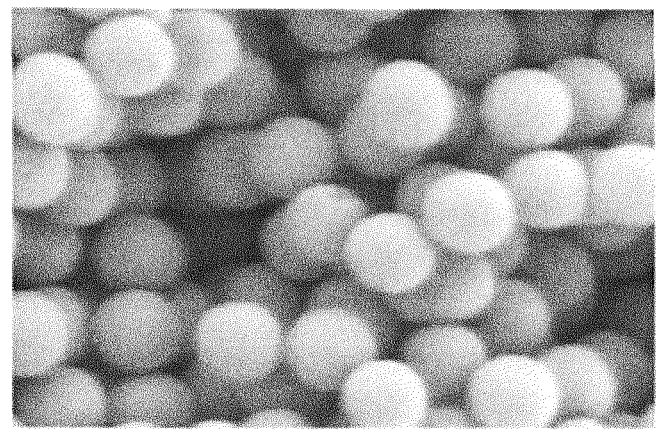
FIG. 38A is an SEM image of 2.5 um uniform plain $Al_2O_3$ nanospheres.
Figure 38B:
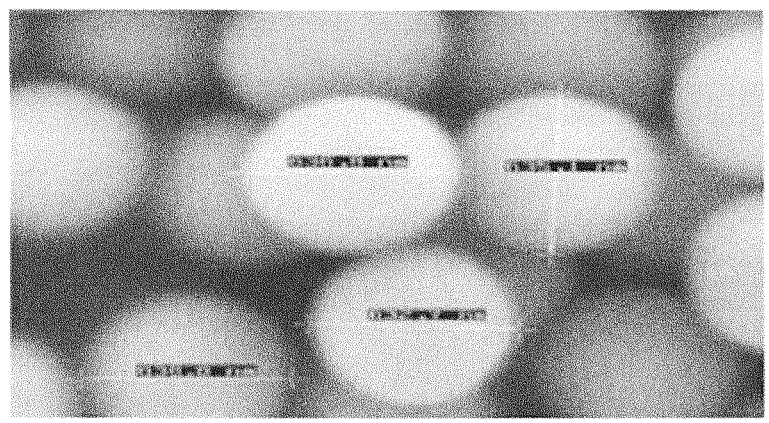
FIG. 38B is an SEM image of 635 nm uniform plain $Al_2O_3$ nanospheres, which have hair-like fibers on the surface.

Referring now to FIGS. 38A and 38B, shown is 2.5 μm uniform plain $Al_2O_3$ nanospheres (FIG. 38A) and 635 nm uniform plain $Al_2O_3$ nanospheres having hair-like fibers on the surface.

Figure 39:
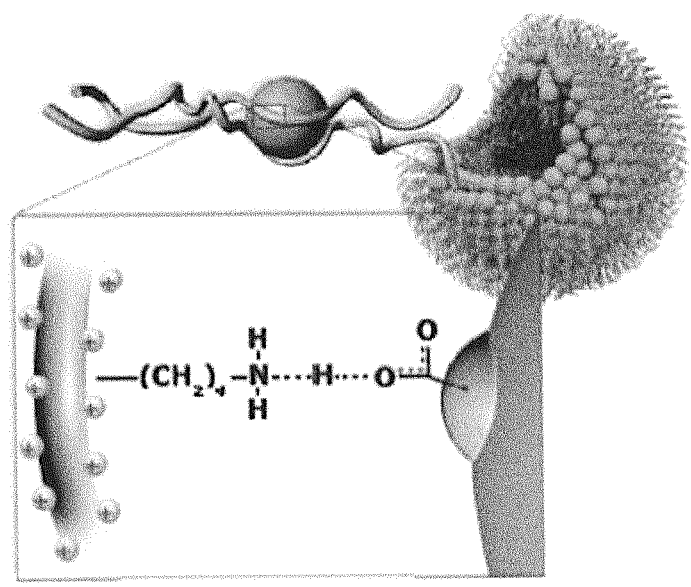
FIG. 39 is a computer-generated model showing hair-like fibers of CoOOH, which shows hair-like fibers which promote boundary layer adhesion so that nano sized particles will stay in contact with the boundary layer while rolling along it, producing kinetic mixing. The figure may be found in J. N. Cha, H. Birkedal, M. H., M. S. Wong and G. D. Stucky, "Spontaneous Formation of Nanoparticle Vesicles from Homopolymer Polyelectrolytes," *J. Am. Chem. Soc.* 125, 8285-8289 (2003).
Figures 40A, 40B:
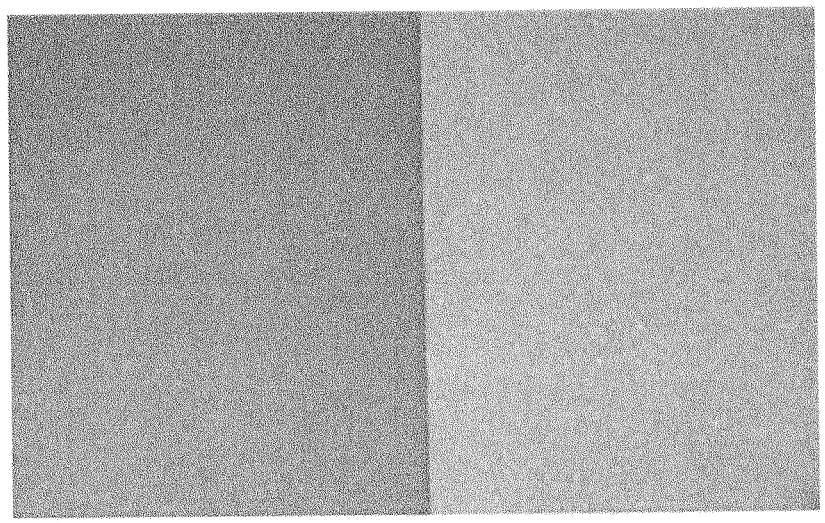
FIG. 40A shows a photograph of Chrysler auto paint with additive (enhance color) for comparison of dispersing capability in paint with the addition of Perlite.
FIG. 40B shows a photograph of Chrysler auto paint without additive shown in FIG. 40B for comparison of dispersing capability in paint with the addition of Perlite (FIG. 40A).

Referring now to FIG. 39, shown is a computer generated model that show hair-like fibers that promote boundary layer adhesion so that nano-sized particles will stay in contact with a boundary layer of a flowing fluid while rolling along the boundary layer and producing kinetic mixing.

It has long been known that nanoparticles have infinity for self-conglomeration which greatly affects its ability to function as a nano particle suspended in a fluid or a gas. The kinetic boundary layer mixing particles produce excellent dispersion properties illustrated by "Additives for Paint, Coatings and Adhesives" (U.S. Patent Application Publication No. 2011/0301247), incorporated herein by reference.

FIG. 7 shows two samples of rigid PVC with the same pigment loading in both samples wherein one sample includes kinetic boundary layer mixing particles.

FIG. 9 shows a rigid PVC with ABS spots.

FIG. 10 shows PVC and ABS mixed together.

FIG. 40 shows a photograph comparison of dispersing capability in paint with and without the addition of Perlite.

Mixing and Blending of Dissimilar Materials

FIG. 9 shows rigid PVC with ABS spots. These two materials, even under high shear conditions chemically do not want to mix or blend together.

FIG. 10 shows the effect the adding kinetic boundary layer mixing particles on dissimilar hard to mix materials. In the extruder, the PVC and ABS mixed together, which resulted in the ABS acting like a black pigment.

FIGS. 40A and 40B show enhanced dispersing capability of pigments in a Chrysler factory color automotive paint. Both spray samples started with the same premixed Chrysler, PB3 Calcdonia Blue, Series: 293 99384 automotive paint. The sample on the left (FIG. 40A) had a type (I) kinetic boundary layer mixing particle made from expanded perlite added in. The kinetic mixing particle is white in color and was added in at 1% by mass. The sample on the right (FIG. 40B) is the standard factory color. It is clear to see that the sample on the left has a darker, as well as richer, color than the sample on the right. This experiment shows that pigment color can be enhanced by mixing nano and micron particles in the boundary layer of a paint. The improved dispersion of pigments is easy to see. However, other additives are also being dispersed better, to produce a more homogenous mixture, even though the other improved dispersal cannot be seen throughout the polymer.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. A method of increasing heat transfer in a flowing fluid comprising the steps of:

dispersing a plurality of kinetic mixing particles having rough and/or sharp edges throughout said fluid;

wherein the flowing fluid has a stream velocity (U) in an inviscid flow region of said flowing fluid;

wherein the flowing fluid has a boundary layer flow velocity (u) in a viscous flow region of said flowing fluid;

defining a theoretical starting diameter of said particles at a height measured perpendicular to a surface where u=0.99U; and wherein said particles interact with the fluid in said viscous flow region for improving a heat transfer mechanism of the fluid.

2. The method according to claim 1 wherein:

wherein said flowing fluid comprises a boundary layer portion having a stagnant film; and said step of interacting comprises creating low surface energy areas that allow bubbles to rapidly escape through said stagnant film for increasing heat transfer and accelerating a phase change of said fluid.

3. The method according to claim 1 wherein:

said step of said particles interacting with said viscous flow region comprises changing said heat transfer mechanism from conductive to convection for accelerating the heat transfer.

4. The method according to claim 1 wherein:

said step of interacting comprises converting a coefficient of friction on a wall of a member through which said fluid flows from static to kinetic for increasing heat transfer by increasing fluid flow velocity.

5. The method according to claim 1 wherein:

the parameters (U) and (u) are affected by filler loading, heat transfer, shear effects and chemical reactions; and wherein the parameters change when said fluid undergoes rapid nucleation, viscosity and density changes.

6. The method according to claim 1 wherein:

said particles are selected from a group consisting of type I, type II, type III, type IV, type V, and type VI.

7. The method according to claim 1 wherein:

said particles are comprised of a mixture of particles selected from at least one group consisting of type I, type II, type III, type IV, type V, and type VI.

8. The method according to claim 1 wherein:

said particles are selected from a group consisting of solid materials, porous materials, manmade or naturally occurring minerals or rocks.

9. The method according to claim 1 wherein:

said particles have three-dimensional wedge-like sharp blades and points.

10. The method according to claim 1 wherein:

said particles have thin walled cellular structures.

11. The method according to claim 1 wherein:

said particles have blades having a Y, V, or X shape.

12. The method according to claim 1 wherein:

said flowing fluid is selected form a group consisting of alcohols, glycols, and ammonia, hydrocarbons, mineral oils, natural oils, synthetic oils, fats, waxes, ethers, esters, halogen derivatives of at least one of the group consisting of hydrocarbons, mineral oils, natural oils, synthetic oils, fats, waxes, ethers, esters, and glycols, silicate esters, biphenyl, polyaromatic compounds, salt-hydrates, organic eutectics, clathrate-hydrates, paraffins, inorganic and organic eutectic mixtures.

13. The method according to claim 1 wherein:

said fluid is a refrigerant.

14. The method according to claim 1 wherein:

said fluid is a nanofluid.

15. A method of increasing heat transfer in a flowing fluid comprising the steps of:

dispersing a plurality of kinetic mixing particles having rough and/or sharp edges throughout said fluid;

wherein the flowing fluid has a stream velocity (U) in an inviscid flow region of said flowing fluid;

wherein the flowing fluid has a boundary layer flow velocity (u) in a viscous flow region of said flowing fluid;

defining a theoretical starting diameter of said particles at a height measured perpendicular to a surface where u=0.99U; and wherein said flowing fluid comprises a boundary layer portion having a stagnant film and a free stream portion; and wherein said particles interact with a surface to produce a polishing effect for reducing calcification deposits on said surface.

16. The method according to claim 15 wherein:
said flowing fluid comprises a boundary layer portion having a stagnant film; and
said step of interacting comprises creating low surface energy areas that allow bubbles to rapidly escape through said stagnant film for increasing heat transfer and accelerating a phase change of said fluid.

17. The method according to claim 15 wherein:
said step of said particles interacting with said viscous flow region comprises changing a heat transfer mechanism from conductive to convection for accelerating the heat transfer.

18. The method according to claim 15 wherein:
said step of interacting comprises converting a coefficient of friction on a wall of a member through which said fluid flows from static to kinetic for increasing heat transfer by increasing fluid flow velocity.

19. The method according to claim 15 wherein:
the parameters (U) and (u) are affected by filler loading, heat transfer, shear effects, and chemical reactions; and
the parameters change when said fluid undergoes rapid nucleation, viscosity and density changes.

20. The method according to claim 15 wherein:
said particles are selected from a group consisting of solid materials, porous materials, manmade or naturally occurring minerals or rocks.

21. The method according to claim 15 wherein:
said particles have three-dimensional wedge-like sharp blades and points.

22. The method according to claim 15 wherein:
said particles have thin walled cellular structures.

23. The method according to claim 15 wherein:
said particles have blades having a Y, V, or X shape.

24. The method according to claim 15 wherein:
said flowing fluid is selected form a group consisting of alcohols, glycols, and ammonia, hydrocarbons, mineral oils, natural oils, synthetic oils, fats, waxes, ethers, esters, halogen derivatives of at least one of the group consisting of hydrocarbons, mineral oils, natural oils, synthetic oils, fats, waxes, ethers, esters, and glycols, silicate esters, biphenyl, polyaromatic compounds, salt-hydrates, organic eutectics, clathrate-hydrates, paraffins, inorganic and organic eutectic mixtures.

25. The method according to claim 15 wherein:
said fluid is a refrigerant.

26. The method according to claim 15 wherein:
said fluid is a nanofluid.

27. The method according to claim 15 wherein:
said fluid is a refrigerant lubricating oil.

28. The method according to claim 15 wherein:
said flowing fluid is in a closed refrigeration system that facilitates a process cycle wherein liquids transition to a gas and back to a liquid.

29. The method according to claim 15 wherein:
said flowing fluid is in a closed turbine system that facilitates a process cycle wherein liquids transition to a gas and back to a liquid.

30. The method according to claim 15 wherein:
said step of dispersing said plurality of kinetic mixing particles improves dispersion of said particles in said fluid for helping to increase heat transfer by keeping said particles in suspension.

31. The method according to claim 1 wherein:
said fluid is a refrigerant lubricating oil at the end of the claim.

32. The method according to claim 1 wherein:
said flowing fluid is in a closed refrigeration system that facilitates a process cycle wherein liquids transition to a gas and back to a liquid.

33. The method according to claim 1 wherein:
said flowing fluid is in a closed turbine system that facilitates a process cycle wherein liquids transition to a gas and back to a liquid.

34. The method according to claim 1 wherein:
said step of dispersing said plurality of kinetic mixing particles improves dispersion of said particles in said fluid for helping to increase heat transfer by keeping said particles in suspension.

* * * * *